(12) United States Patent
Malik

(10) Patent No.: US 7,932,831 B2
(45) Date of Patent: Apr. 26, 2011

(54) CROWD DETERMINATION

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 501 days.

(21) Appl. No.: 11/456,675

(22) Filed: Jul. 11, 2006

(65) Prior Publication Data

US 2008/0016018 A1    Jan. 17, 2008

(51) Int. Cl.
*G08B 23/00* (2006.01)

(52) U.S. Cl. .......... 340/573.1; 340/286.06; 340/286.07; 340/286.08; 340/286.09; 705/2; 709/231; 709/244

(58) Field of Classification Search ............... 340/573.1, 340/286.06–286.09; 705/2; 709/231
See application file for complete search history.

(56) References Cited

U.S. PATENT DOCUMENTS

| 6,289,279 | B1 * | 9/2001 | Ito et al. ........................ 701/213 |
| 6,633,232 | B2 * | 10/2003 | Trajkovic et al. .......... 340/573.1 |
| 2003/0065805 | A1 * | 4/2003 | Barnes, Jr. .................... 709/231 |
| 2005/0071190 | A1 * | 3/2005 | Herger et al. ..................... 705/2 |
| 2005/0221806 | A1 * | 10/2005 | Sengupta et al. .......... 455/414.3 |

* cited by examiner

*Primary Examiner* — George A Bugg
*Assistant Examiner* — Ojiako Nwugo
(74) *Attorney, Agent, or Firm* — Thomas, Kayden, Horstemeyer & Risley, LLP

(57) ABSTRACT

Included are methods for providing crowd determination. At least one embodiment of a method includes receiving presence data related to at least one subject in an environment and determining at least one occupancy statistic of the environment from the received presence data. At least one other embodiment of a method includes providing at least one occupancy statistic of the environment.

20 Claims, 20 Drawing Sheets

CROWD DETERMINATION

BACKGROUND

While many Internet users shop online, there are still many reasons to visit a local store to purchase goods. More specifically, for many items, people prefer to physically handle merchandise before purchasing. Additionally, many people prefer an in-person discussion with a store employee before purchasing. Other people simply desire the ability to use the product immediately instead of having to wait for the item to ship.

While these and other conveniences exist with physically purchasing items at a store, many people do not want to deal with having to wait in line when they arrive at the store. More specifically, people may not know whether a store is busy or whether store traffic is reduced enough to quickly and easily enter the store, purchase the desired goods and/or services, and leave the store. While people can determine store congestion by looking at the parking lot, there is generally not a way to accurately determine store congestion from a remote location. Additionally, there is generally not a way for store administrators to effectively monitor store congestion, as well is provide improved customer service from the monitored data. These problems may also exist with restaurants and other businesses.

Thus, a heretofore unaddressed need exists in the industry to address the aforementioned deficiencies and inadequacies.

SUMMARY

Included are methods for providing crowd determination. At least one embodiment of a method includes receiving presence data related to at least one subject in an environment and determining at least one occupancy statistic of the environment from the received presence data. At least one other embodiment of a method includes providing at least one occupancy statistic of the environment.

Also included are embodiments of a computer readable medium for providing crowd determination. At least one embodiment of a computer readable medium includes logic configured to receive presence data related to at least one subject in an environment and logic configured to determine at least one occupancy statistic of the environment from the received presence data. Other embodiments include logic configured to provide at least one occupancy statistic of the environment.

Also included are systems for providing crowd determination. At least one embodiment of a system includes a receiving module configured to receive presence data related to at least one subject in an environment and a determining module configured to determine at least one occupancy statistic of the environment from the received presence data. Other embodiments include a providing module configured to provide at least one occupancy statistic of the environment.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
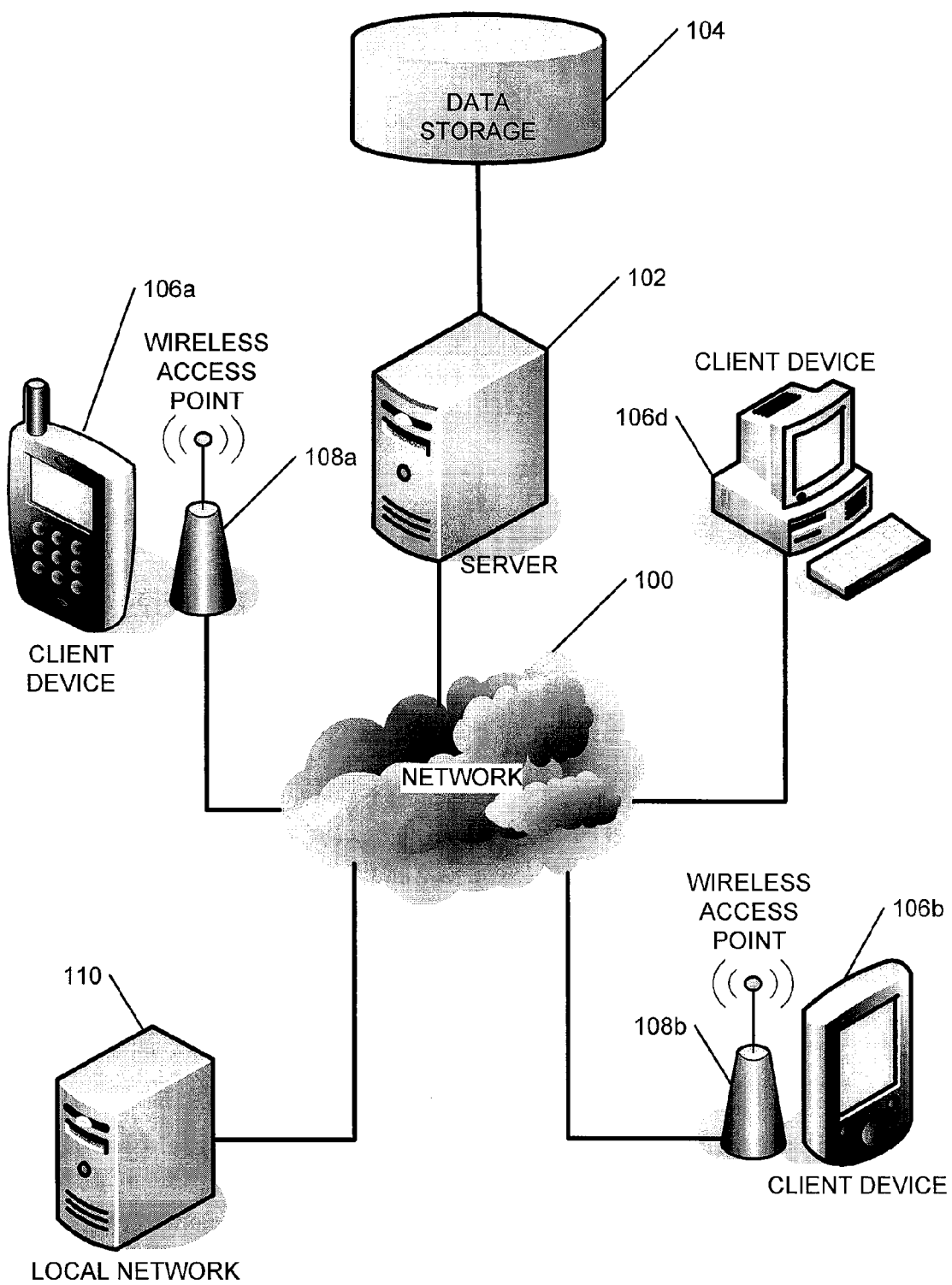
FIG. 1 is a functional diagram of an exemplary communications network environment.

FIG. 1 is a functional diagram of an exemplary communications network environment. As illustrated, a plurality of users may be connected via an external network such as communications network 100. Communications network can include, for example, the Internet, a Wi-Fi® network (IEEE 802.11 compatible), a Wi-Max network (IEEE 802.16 compatible), a Public Switched Telephone Network (PSTN), a cellular communications network and/or other communications mediums. The users may access the communications network 100 via client devices 106a (via wireless access point 108a), 106b (via wireless access point 108b), client device 106d, and/or via local network 110. The client devices may include, for example, portable communication devices 106a and 106b, a personal computer 106d (as discussed in more detail below), and/or other communication devices. It should be appreciated that while network 100, client devices 106, and connections illustrated in FIG. 1 are shown by way of example, this disclosure is not limited to these examples. The disclosure may be applicable to any client device, connection, and network that supports voice, data, and/or other types of communications. Additionally included in this nonlimiting example is a server 102 that is coupled to data storage 104.

Depending on the type of communication desired, different functionality may be utilized. More specifically, while client devices 106a and 106b may be configured to facilitate voice communications over a cellular network and/or a PSTN, they may also be configured for data communications via the Internet. Additionally, client devices 106a and 106b may also be configured to facilitate communications via a Wi-Fi® network and/or a Wi-Max network. As a nonlimiting example, if a user operating client device 106a wishes to make a cellular communication, the user can input the address (e.g., telephone number) of the callee device. This address can be sent to the wireless access point 108a (which may include a cellular antenna and/or other component), configured to send the communication request to network 100. Network 100 may employ one or more cellular networks, PSTNs and/or other networks for facilitating the communication. Upon connecting client device 106a with the callee device, communication may begin.

Similarly, if a user operating client device 106b wishes to access a website (and/or other data associated with the Internet), the user can send a communication request, which may include an address, such as a Uniform Resource Locator (URL). The request can be sent to the desired computing device (such as server 102 and/or data storage 104) via network 100, which may include the Internet, a Wi-Max network and/or a Wi-Fi® network. The desired computing device can then respond by sending the requested data to the client device 106b via the same (or similar) transmission mediums.

Additionally included in FIG. 1 is a local network 110, which may also be coupled to network 100. Local network 110 can include one or more components for facilitating communications within local network 110, as well as communications via network 100.

Figure 2:
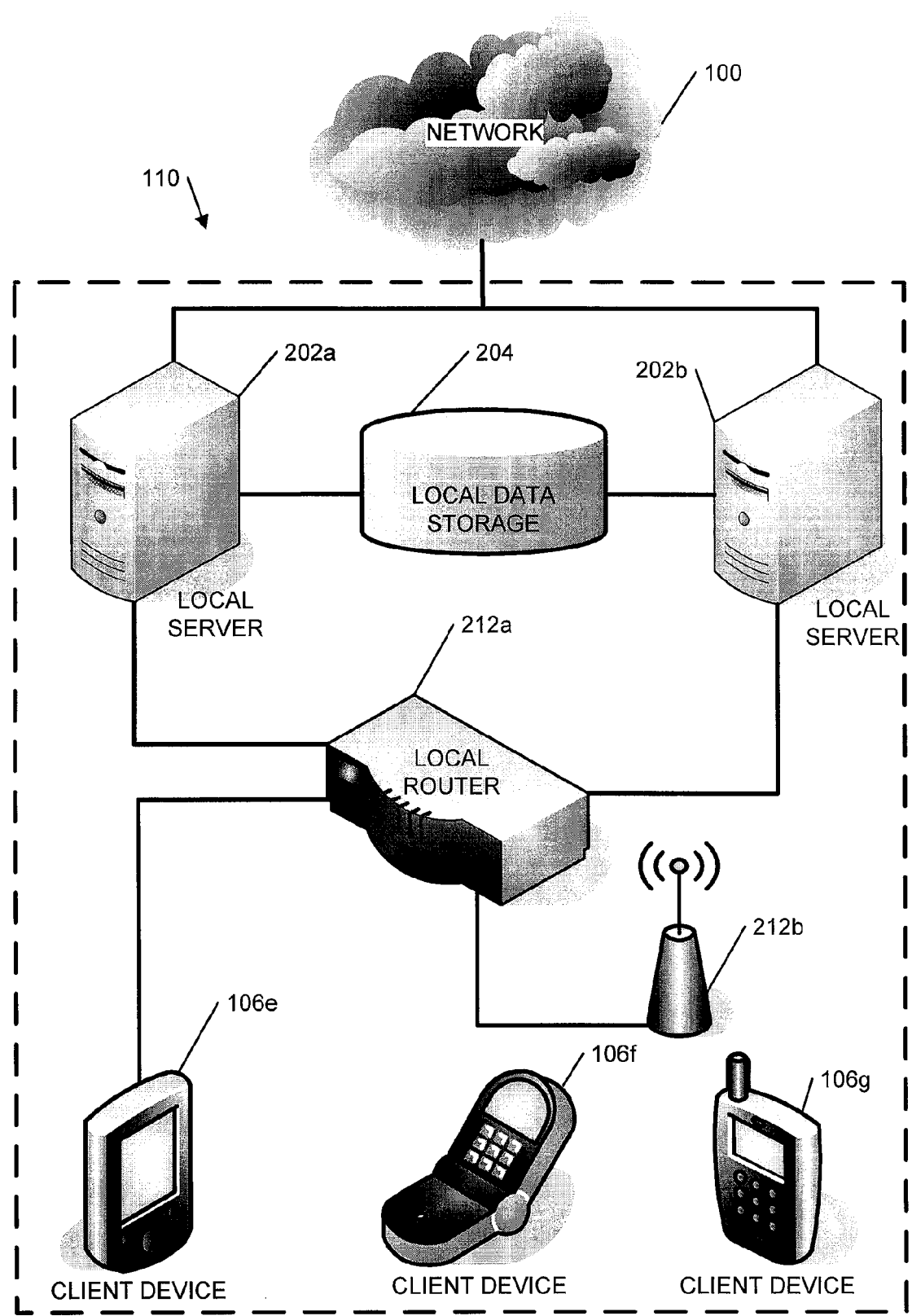
FIG. 2 is a functional diagram of an exemplary local network environment by which a user can communicate, similar to the environment from FIG. 1.

FIG. 2 is a functional diagram of an exemplary local network environment by which a user can communicate, similar to the environment from FIG. 1. The local network environment of FIG. 2 can be a home network, a business network and/or other network configured to facilitate communication of data. As illustrated, client devices 106e, 106f, 106g are coupled to a local router 212a. Depending on the particular configuration, this coupling may be wire-line or wireless. More specifically, as illustrated, local router 212a may include (and/or may be coupled to) a wireless access point 212b. Depending on the particular configuration, client devices may be physically coupled to local router 212a (e.g., client device 106e) and/or wirelessly coupled to local router 212a via wireless access point 212b (e.g., client devices 106f and 106g).

In addition, local router 212a is also coupled to local server 202a and local server 202b. The local servers 202a, 202b (collectively referred to as local server 202) are coupled to local data storage 204. The local servers 202 are also coupled to an external network, such as the communications network 100.

In this exemplary networking environment a user located at client device 106e may desire to communicate with a recipient located at client device 106g. In the networking environment of FIG. 2, the user at client device 106e can facilitate a communication with client device 106g. The data (which may include voice, video, images, and/or other data) can then be sent from the client device 106e to the local router 212a. The local router 212a can then send the communication data to one (or more) of the local servers 202. The local servers 202 can then communicate the message back through the local router 212a to the intended recipient located at client device 106g.

Similarly, client devices 106 may also be configured to communicate with local servers 202. Depending on the particular configuration, local servers 202 (potentially with the assistance with local data storage 204) may be configured with data that a user on client device 106 may find useful. In such a scenario, data may be communicated to and from client devices 106 and servers 202 without utilization of communications network 100.

As the nonlimiting example of FIG. 2 illustrates, data can be sent internal to the local network, without the use of an external network, such as the network 100. Additionally, while the configuration of FIG. 2 facilitates intra-network communications, such a configuration could also facilitate inter-network communications, similar to the configuration from FIG. 1. In such a scenario, a user operating client device 106f can send data to and receive data from a client device and/or computing device that is not located within the local network of FIG. 2 via client device 106f. The data can be sent through local router 212a to local server 202. From local server 202, the data can be sent to an external network, such as network 100.

Referring back to FIG. 1, the data can then be sent from local network 110 to server 102, and then back through network 100 to client device 106b. The user that is operating client device 106b can then reply through the same channels. More specifically, the reply data can be sent from 106b through the network 100 to the server 102. The communication can then be sent back through network 100, to local network 110 (to FIG. 2), to the local server 202, through the local router 212a (and wireless access point 212b), back to the user at client device 106f.

One should note that the configuration of FIG. 2 is a nonlimiting example. Components can be added or removed (or both) without diverging from the scope of this disclosure. Additionally, while some communications may use communications network 100, others do not. More specifically, two users that are engaged in a communications session on the same local network 110 may not require the use of the network 100 to facilitate the communication. As local network 110 can link a user to network 100, two users operating on the same local network 110 may simply use that local network 110 to facilitate the communication. In such a scenario, the configuration of FIG. 2 becomes more applicable, even for users who are not otherwise related.

Figure 3:
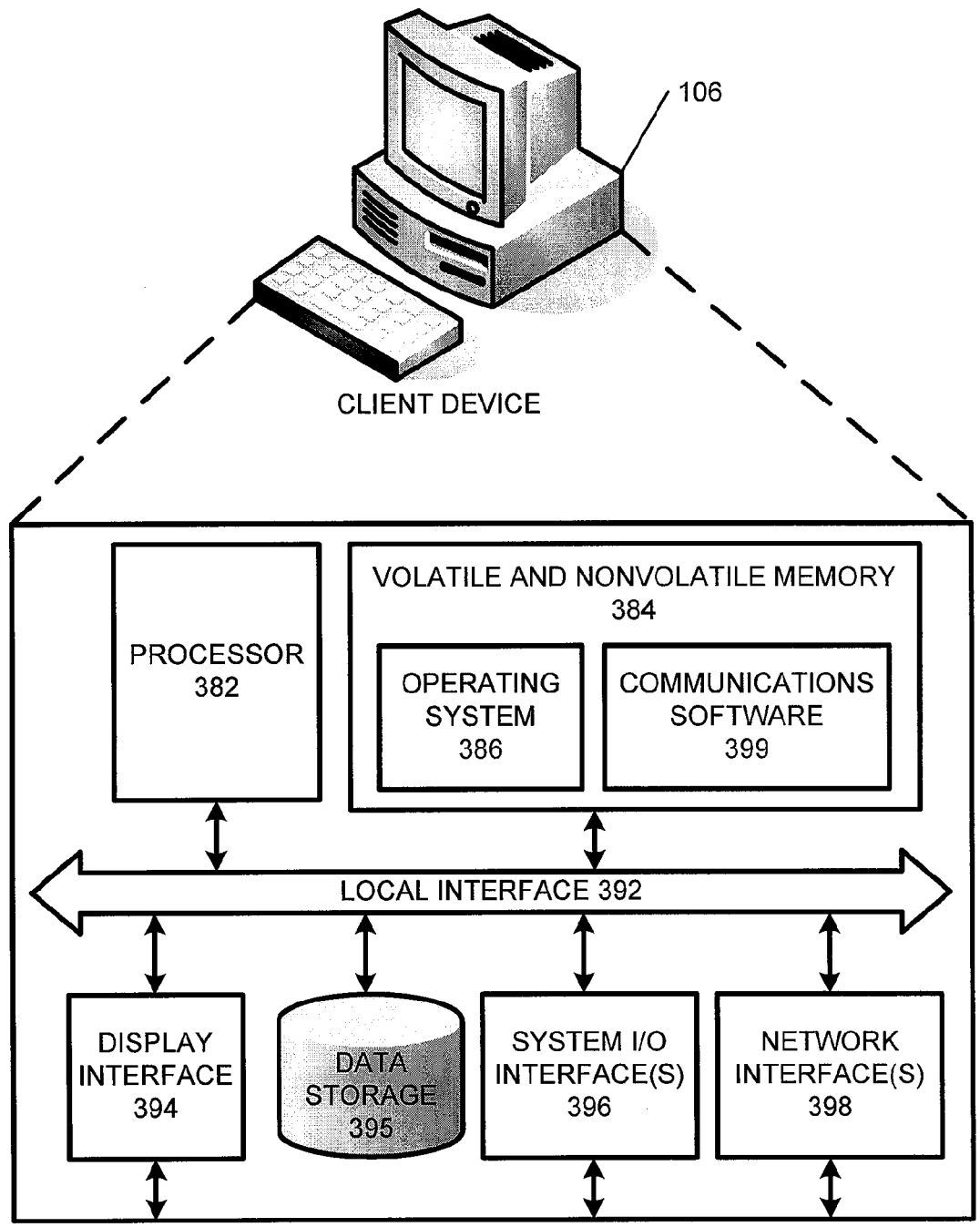
FIG. 3 is a functional diagram illustrating an exemplary embodiment of a client device that may be configured to communicate via a communications network such as the networks from FIGS. 1 and 2.

FIG. 3 is a functional diagram illustrating an exemplary embodiment of a client device that may be configured to communicate via a communications network such as the networks from FIGS. 1 and 2. Although a wire-line client device is illustrated, this discussion can be applied to other devices including, but not limited to a mobile telephone, a portable telephone, a wireless personal computer, a wire-line personal computer, a PDA, a blackberry, an IPOD, and other devices configured to facilitate communications. Generally, in terms of hardware architecture, as shown in FIG. 3, the client device 106 includes a processor 382, volatile and nonvolatile memory 384, a display interface 394, data storage 395, one or more input and/or output (I/O) device interface(s) 396, and/or one or more network interface 398 that are communicatively coupled via a local interface 392. The local interface 392 can include, for example but not limited to, one or more buses or other wired or wireless connections. The local interface 392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 382 may be a hardware device for executing software, particularly software stored in volatile and nonvolatile memory 384.

The processor 382 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions.

The volatile and nonvolatile memory 384 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 384 may incorporate electronic, magnetic, optical, and/or other types of storage media. One should note that the volatile and nonvolatile memory 384 can have a distributed architecture (where various components are situated remote from one another), but can be accessed by the processor 382. Additionally volatile and nonvolatile memory 384 can include communications software 399 and an operating system 386.

The software in volatile and nonvolatile memory 384 may include one or more separate programs, each of which includes an ordered listing of executable instructions for implementing logical functions. In the example of FIG. 3, the software in the volatile and nonvolatile memory 384 may include communications software 399 (which can include instant messaging software, email software, web browsing software, telephony software, etc. in one or more separate software packages), as well as operating system 386. The operating system 386 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the operating system 386.

The Input/Output devices that may be coupled to system I/O Interface(s) 396 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more network interfaces 398 for facilitating communication with one or more other devices. More specifically, network interface 398 may include any component configured to facilitate a connection with another device. While in some embodiments, among others, the client device 106 can include a network interface 398 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 398 for communicating via a wired connection. Such interfaces may be configured with Universal Serial Bus (USB) interfaces, serial ports, and/or other interfaces.

If the client device 106 is a personal computer, workstation, or the like, the software in the volatile and nonvolatile memory 384 may further include a basic input output system (BIOS) (omitted for simplicity). The BIOS is a set of software routines that initialize and test hardware at startup, start the operating system 386, and support the transfer of data among the hardware devices. The BIOS is stored in ROM so that the BIOS can be executed when the client device 106 is activated.

When the client device 106 is in operation, the processor 382 may be configured to execute software stored within the volatile and nonvolatile memory 384, to communicate data to and from the volatile and nonvolatile memory 384, and to generally control operations of the client device 106 pursuant to the software. Software in memory, in whole or in part, may be read by the processor 382, perhaps buffered within the processor 382, and then executed.

Figure 4:
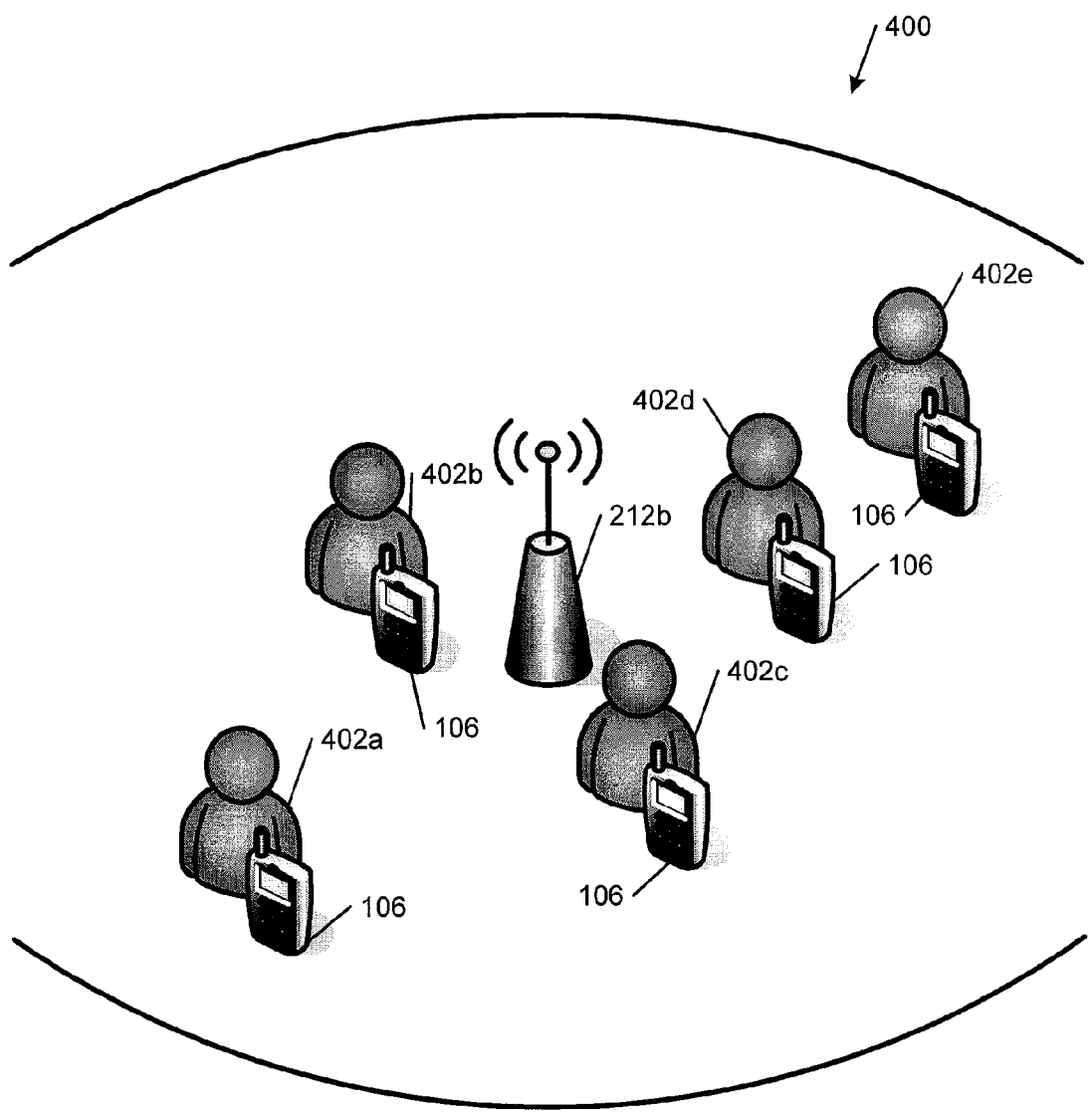
FIG. 4 is a perspective diagram illustrating an exemplary embodiment of utilization of a crowd determination system, similar to the diagram from FIG. 2.

FIG. 4 is a perspective diagram illustrating an exemplary embodiment of utilization of a crowd determination system, similar to the diagram from FIG. 2. As illustrated in this nonlimiting example, a wireless access point 212b (and/or wireless router, not shown) may be located in an environment 400. The environment 400 can include a retail shopping establishment, restaurant, fitness center, house, sporting event venue, concert venue, etc. As discussed above, the wireless access point 212b may be configured to facilitate communication between operating client devices 106 and local router 212a. The local router 212a and/or wireless access point 212b can operate using Wi-Fi® communication protocols, Wi-Max protocols, and/or other protocols. Regardless of the communications protocol being utilized, the local router 212a can be configured to detect the number of client devices 106 within range of the wireless access point 212b. Additionally, the local router 212a can also be configured to determine an identifier associated with one or more of the client devices 106 that are within range of the wireless access point 212b. Still other configurations can provide data related to the location of one or more of the client devices 106 in the environment 400.

One should note that while one wireless access point 212b may be included in environment 400, this is a nonlimiting example. Depending on the size of the environment 400, range of the wireless access point 212b, and/or other factors, one or more wireless access point 212b (and/or router 212a)

may be included in the environment 400. Additionally, depending on the particular configuration, one or more access point 212b may be included to more accurately determine the presence and/or location of a particular client device 106.

One should also note that, in addition to determining presence, identification, and location data related to a client device 106, the local network 110 may also be configured to receive data from and send data to a subject 402a-402e operating client device 106. Depending on the particular configuration, local network may provide data requested by subject 402 as well as facilitate communication with external network 100.

Figure 5:
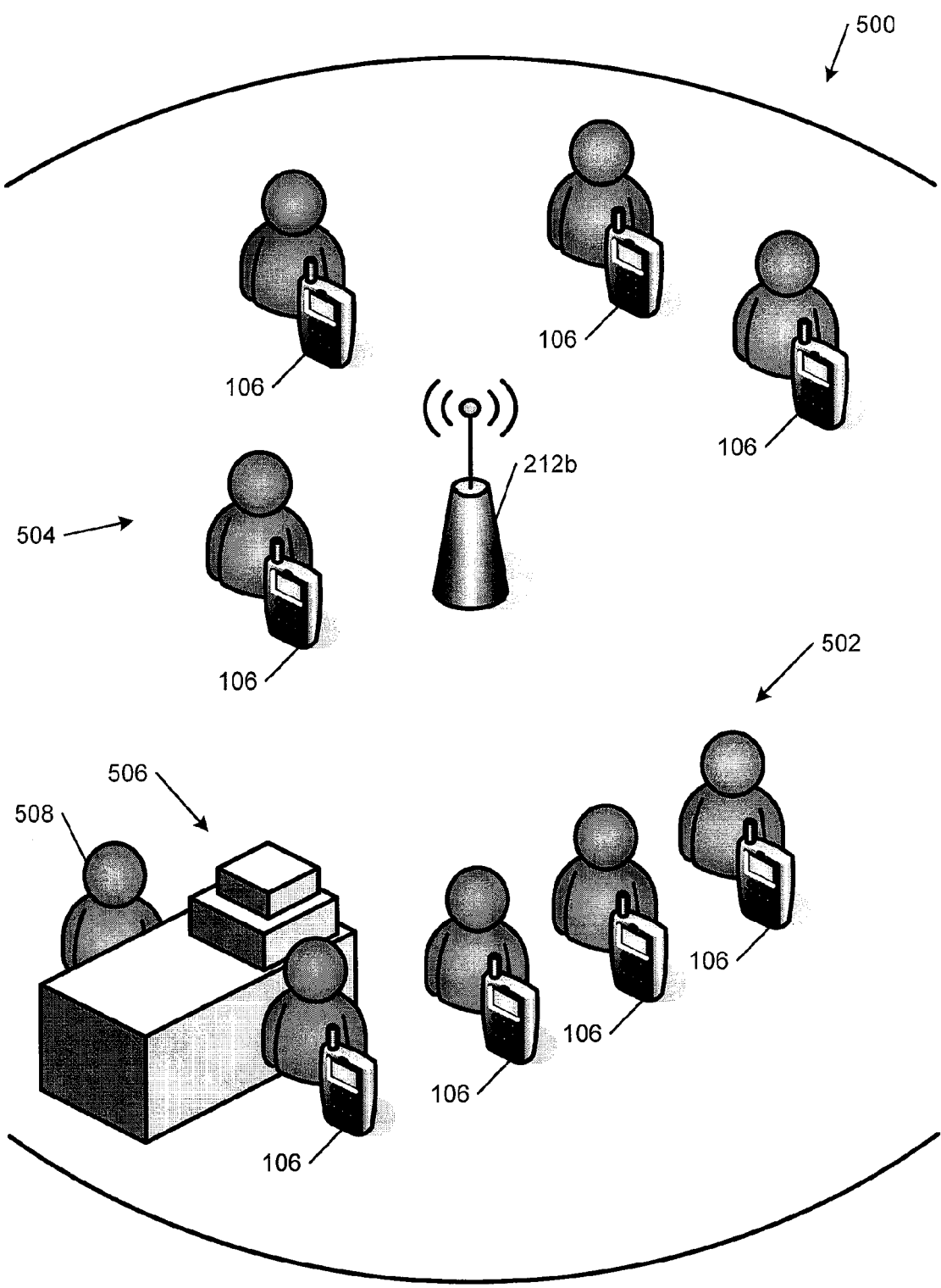
FIG. 5 is a perspective diagram illustrating an exemplary embodiment of crowd presence and location determination, similar to the diagram from FIG. 4.

FIG. 5 is a perspective diagram illustrating an exemplary embodiment of crowd presence and location determination, similar to the diagram from FIG. 4. As in the previous nonlimiting example, local network 110, via wireless access point 212b, can be configured to determine the presence and/or location of one or more client device 106 currently located in environment 500. However, in this nonlimiting example, local network 110, via wireless access point 212b, can be configured to make at least one determination regarding the current occupancy based on the presence and location of client devices 106. More specifically, environment 500 may include a retail establishment, such as a grocery store. As illustrated, environment 500 includes a purchase lane 506, where subjects 502 may purchase goods and/or services. As illustrated, the first group of subjects 502 are carrying a client device 106. Employee 508 may also be included in environment 500 to assist the first group of subjects 502 in purchasing the goods.

Also included in environment 500 are a second group of subjects 504. The second group of subjects 504 may be browsing for goods and/or services in environment 500, but have not yet decided on a purchase. As the second group of subjects 504 may increase the total number of subjects in environment 500, but may not affect wait times for purchasing goods, the second group of subjects 504 may be accounted differently than the first group of subjects 502.

One should note that, while a single wireless access point 212b is illustrated as monitoring environment 500, this is a nonlimiting example. More specifically, depending on the particular configuration, a plurality of wireless access points may be used to determine presence, location, etc. of the environment. Additionally, while not shown in FIG. 5, presence, location, etc. of subjects in an environment may be determined via one or more cameras, motion detectors, and/or other sensors.

Figure 6:
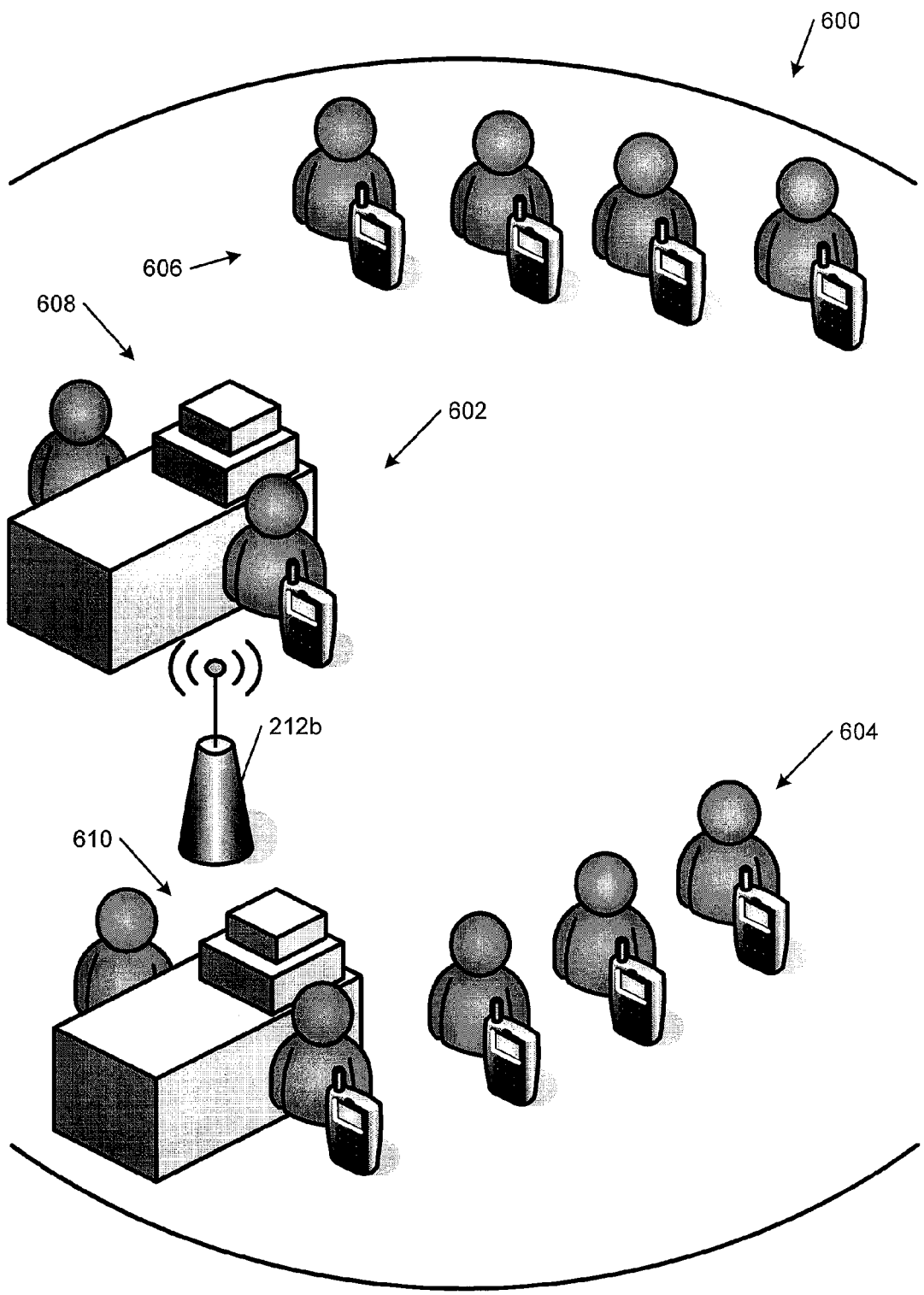
FIG. 6 is a perspective diagram of an exemplary embodiment of crowd presence and location determination in an environment with a plurality of purchase lanes, similar to the diagram from FIG. 5.

FIG. 6 is a perspective diagram of an exemplary embodiment of crowd presence and location determination in an environment with a plurality of purchase lanes, similar to the diagram from FIG. 5. More specifically, environment 600 includes purchase lanes 608 and 610. As illustrated, purchase lane 608 currently serves one subject 602, while purchase lane 610 is currently serving four subjects 604. Due to any number of reasons, the subjects 604 may not realize that other purchase lanes are open with less wait. As local network 110 is monitoring each of the purchase lanes 608, 610, local network 110 can, via wireless access point 212b, determine that purchase lane 608 currently serves one subject, while purchase lane 610 currently serves four subjects 604. Additionally, local network 110 can determine the number and locations of idle users 606. As discussed in more detail below, local network 110 can utilize this information for providing data to potential customers, current customers, and/or environment administrators.

Figure 7:
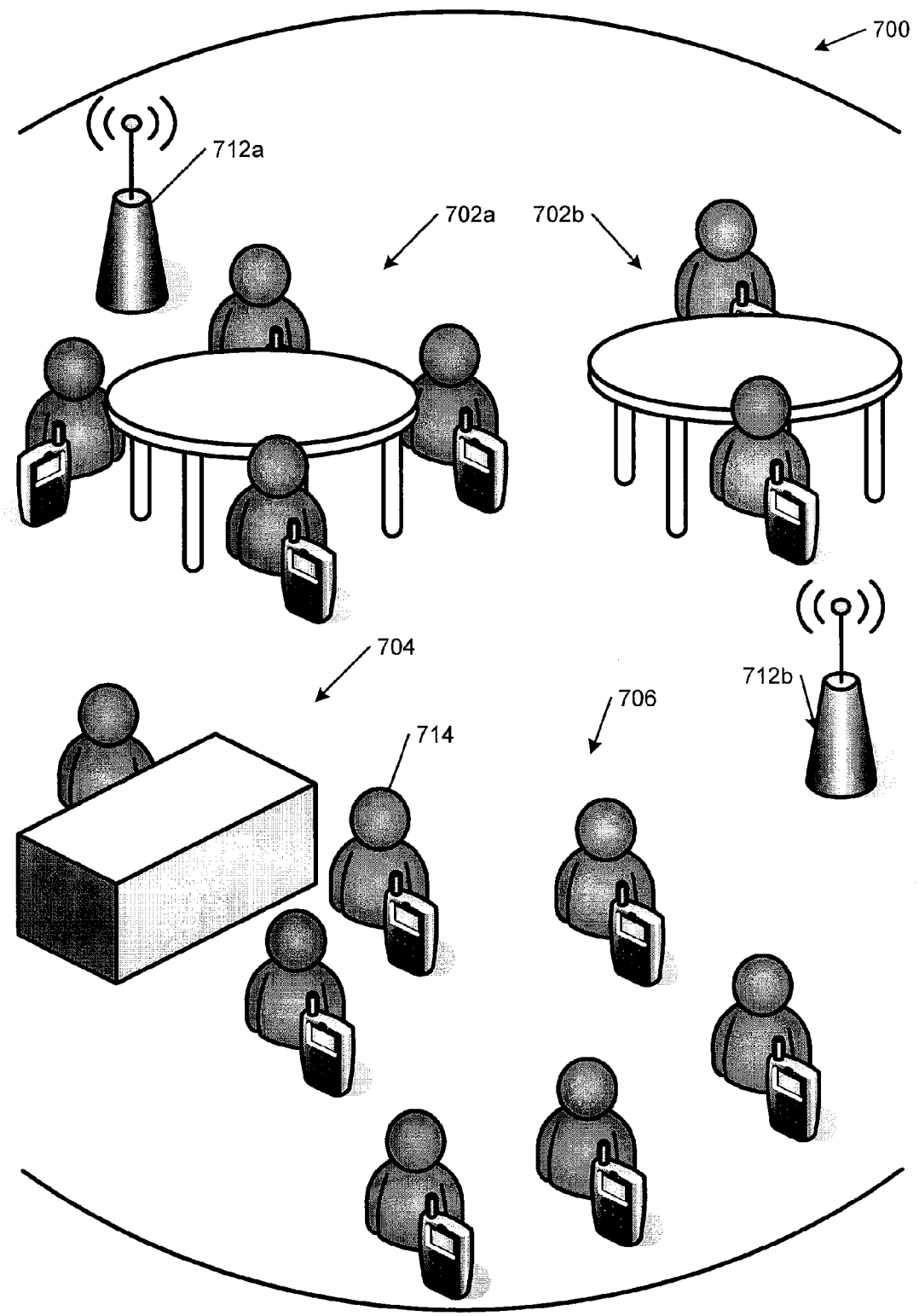
FIG. 7 is a perspective diagram of an exemplary embodiment of utilizing a plurality of wireless access points in an environment, similar to the diagram from FIG. 6.

FIG. 7 is a perspective diagram of an exemplary embodiment of utilizing a plurality of wireless access points in an environment, similar to the diagram from FIG. 6. As illustrated in this nonlimiting example, environment 700 can include a restaurant with wireless access point 712a and wireless access point 712b. Wireless access point 712a can be configured to facilitate communication with client devices associated with seated customers 702a and 702b. Similarly, wireless access point 712b can be configured to facilitate communication with client devices associated with waiting customers 706. Upon entering environment 700, client devices related to waiting customers 706 can be monitored. As waiting subjects 706 check in with the headwaiter 704, information such as number of people, seating request, etc. can be associated with one or more of the client devices. Additionally, as a plurality of people in a single group may have a client device configured to communicate with wireless access point 712, the headwaiter can determine those in that group. The headwaiter can accomplish this by asking the group representative, associating location with respect to the group representative, and/or other techniques. By determining which client devices are part of a single group, local network 110 can more accurately determine the wait time, congestion, etc. for other subjects.

One should note that, as discussed above, local network 110 can be configured to determine location as well as presence of one or more subjects in an environment. As a nonlimiting example, local network 110 associated with wireless access points 712a and 712b that can be configured to determine locations of subjects 702, 706 by determining a signal strength associated with a particular client device at each wireless access point 712. More specifically, wireless access point 712b can detect client device 106 associated with subject 714. The signal strength between the wireless access point 712b and client device 106 may be determined. Additionally, in at least one embodiment, the direction of the connection can also be determined. Similarly, wireless access point 712a may be also be receiving a signal from client device 106 associated with subject 714. As the strength and/or direction of this signal can be determined, local network 110 can utilize this information to determine the location of subject 714. Additionally, depending on the particular configuration, this information can be associated with a layout of the environment to determine points of interest in environment 700.

One should also note that in at least one embodiment, client device 106 can be configured for receiving a user-configured crowd determination setting. More specifically, client device 106 can be configured to receive a crowd determination parameter from a user, based on his or her experience in an environment. In such a configuration, a user can be located in environment 500. The user can then make a determination as to his or her preference based on the current relative congestion of environment 500. The user can then make a selection on client device 106 indicating "too crowded," "optimum congestion," "not crowded enough," etc. Client device document the user-specified congestion level and/or communicate this data to another device (e.g., network 100, server 102, other client device 106, etc.). This data can be utilized with the determined actual congestion of environment 500, which can then be used for future determinations of a desired relative congestion level in this and/or other environments.

As a nonlimiting example, if there are 100 people currently located in environment 500 and the user (who may or may not be physically located in environment 500) selects "too crowded" option on client device 106, a determination can be made, such that when there are 100 or more people in environment 500, the user generally will not want to visit environment 500. Similarly comparisons of the user-configured congestion level to other congestion statistics (such as occupancy percentage, time waiting, etc.) can be made to determine whether a user will desire to visit this environment and/or other environments in the future.

Figure 8:
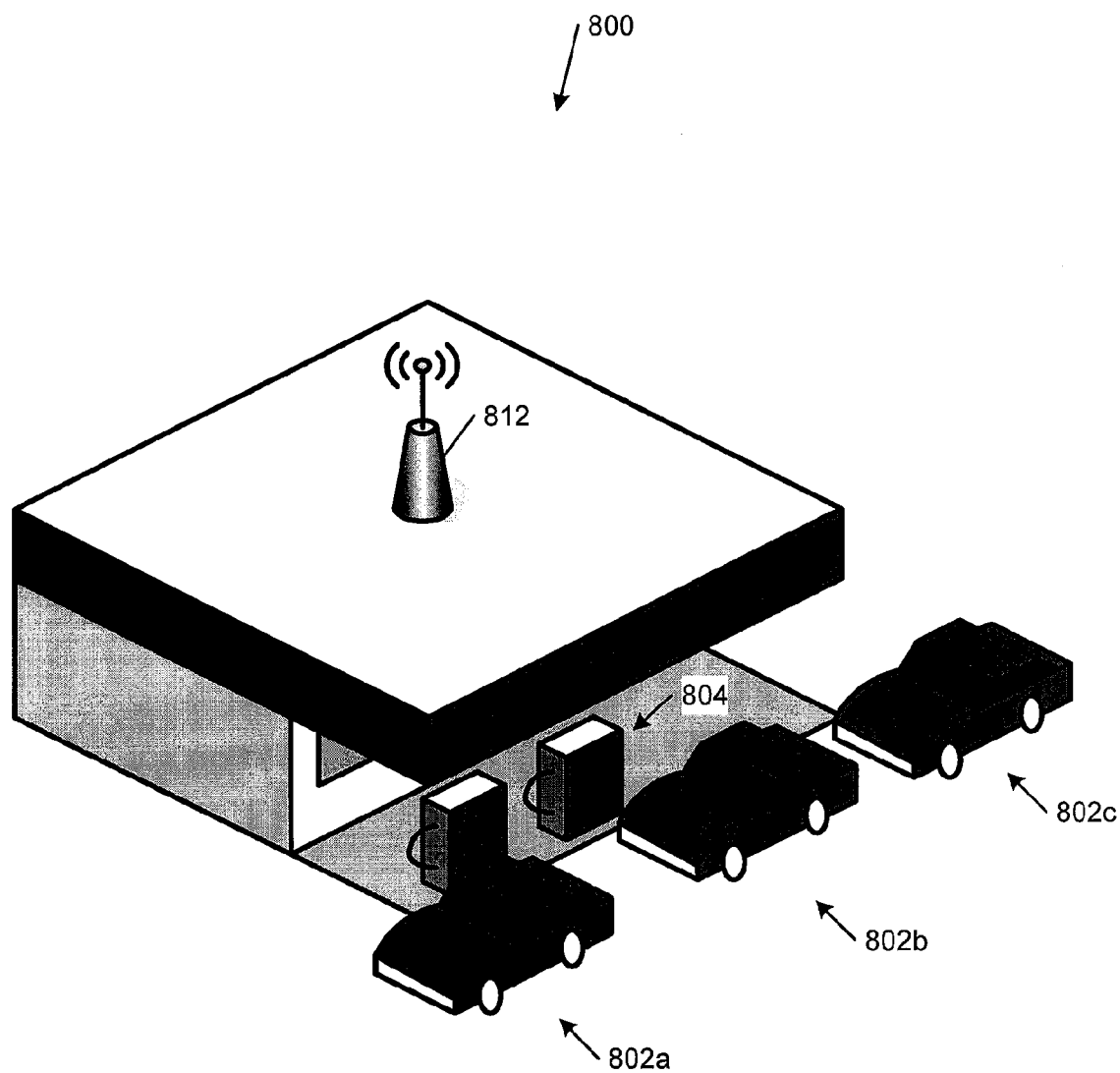
FIG. 8 is a perspective diagram of an exemplary embodiment of crowd determination at a service station, similar to the diagram from FIG. 7.

FIG. 8 is a perspective diagram of an exemplary embodiment of crowd determination at a service station, similar to the diagram from FIG. 7. As illustrated, subjects 802a, 802b and 802c (illustrated as automobiles in this nonlimiting example) may be waiting in line for service at environment 800. Wireless access point 812 can be configured to detect one or more wireless devices associated with subjects 802a, 802b and/or 802c. Additionally, a determination can be made by local network 110 as to whether wireless access point is detecting more than one wireless device in each subject 802. Upon determining the number and/or locations of subjects 802 in environment 800, versus the number and location of service points 804, local network 110 can determine factors such as wait time, as well as make other determinations.

One should note, that while a wireless access point 812 is illustrated as facilitating determination of the presence and location of subjects 802, this is a nonlimiting example. More specifically, any detection device can be utilized for this purpose, including but not limited to one or more cameras, motion sensors, proximity sensors, etc.

One should also note that while discussion related to FIGS. 4-8 described collection of presence, location, and other information in an environment, these are nonlimiting examples. More specifically, in at least one embodiment local network 110 can be configured to manipulate the collected data. Data such as occupancy level, wait times for subjects requesting service, etc. can be determined based on the determined number of subjects in an environment (and/or portion of an environment), and/or other data. Similarly, other calculations may be made to determine the current level of occupancy, historical level of occupancy, efficiency, etc.

Figure 9:
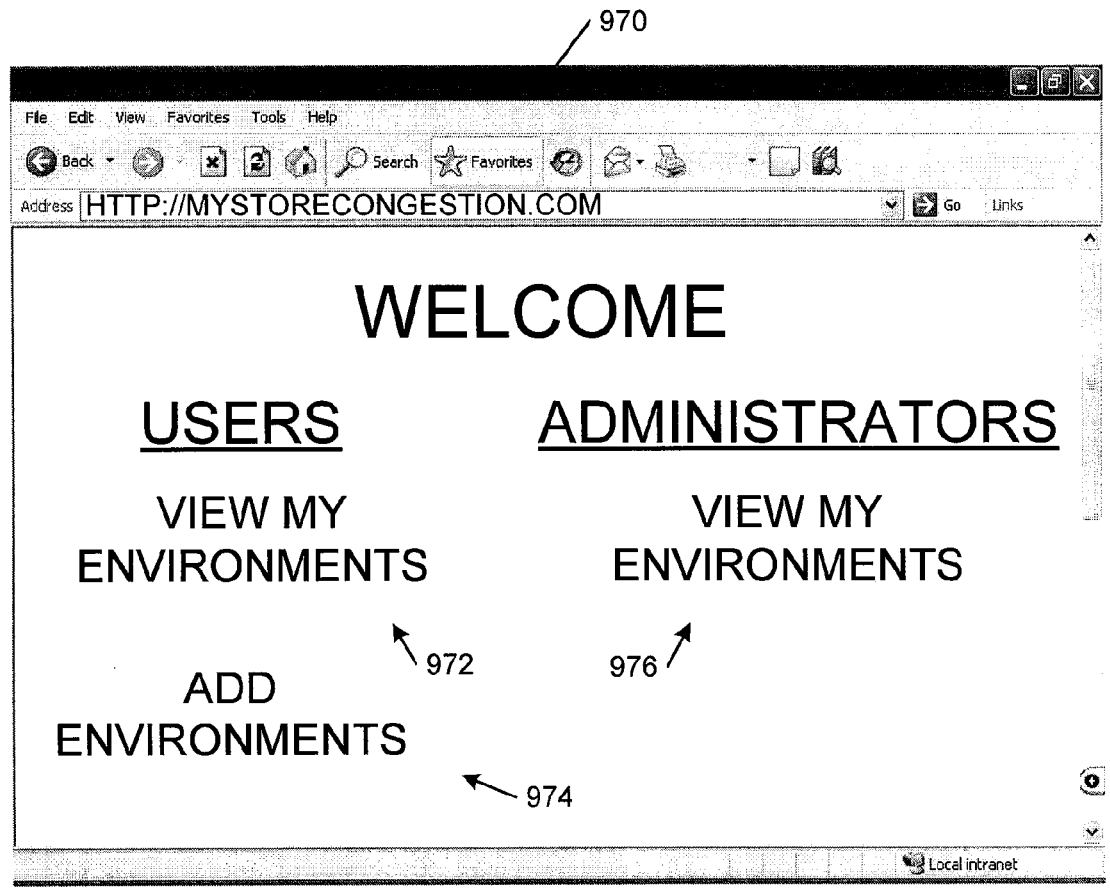
FIG. 9 is an exemplary user interface associated with a local network, such as the local network from FIG. 1.

FIG. 9 is an exemplary user interface associated with a local network, such as the local network from FIG. 1. As illustrated, user interface 970 includes a welcome banner, as well as a plurality of options. User options include a "view my environments" option 972 and a "add environments" option 974. Administrators options include a "view my environments" option 976.

More specifically, as discussed above, various data can be monitored in an environment. Data such as congestion of subjects, location of subjects, etc. can be determined by one or more sensor (such as a wireless access point, camera, and/or other sensors). Upon receiving this data, local network 110 can facilitate computation of this data, as well as display of at least a portion of this data. While in some embodiments this data can be provided locally to administrators of the environment, in at least one configuration, this data can be provided via network 100 (which may include the Internet) to users and/or administrators. As discussed in more detail below, users can utilize this information for any of a plurality of purposes, one of which may be to determine whether the environment is currently accessible, based on the received data. Similarly, administrators of an environment may utilize this data for determining efficiencies, successes, failures, etc. for the environment. If the administrator is associated with a plurality of related environments (e.g., retail franchise), the administrator can determine various data relative to one or more of the environments.

One should note that, while this information can be provided directly from the environment (and/or group of related environments) to the user/administrator, other configurations can provide a centralized website for providing data related to a plurality of environments. One should also note that while a website configuration is described, any technique for providing the desired data may be included within the scope of this disclosure.

Figure 10:
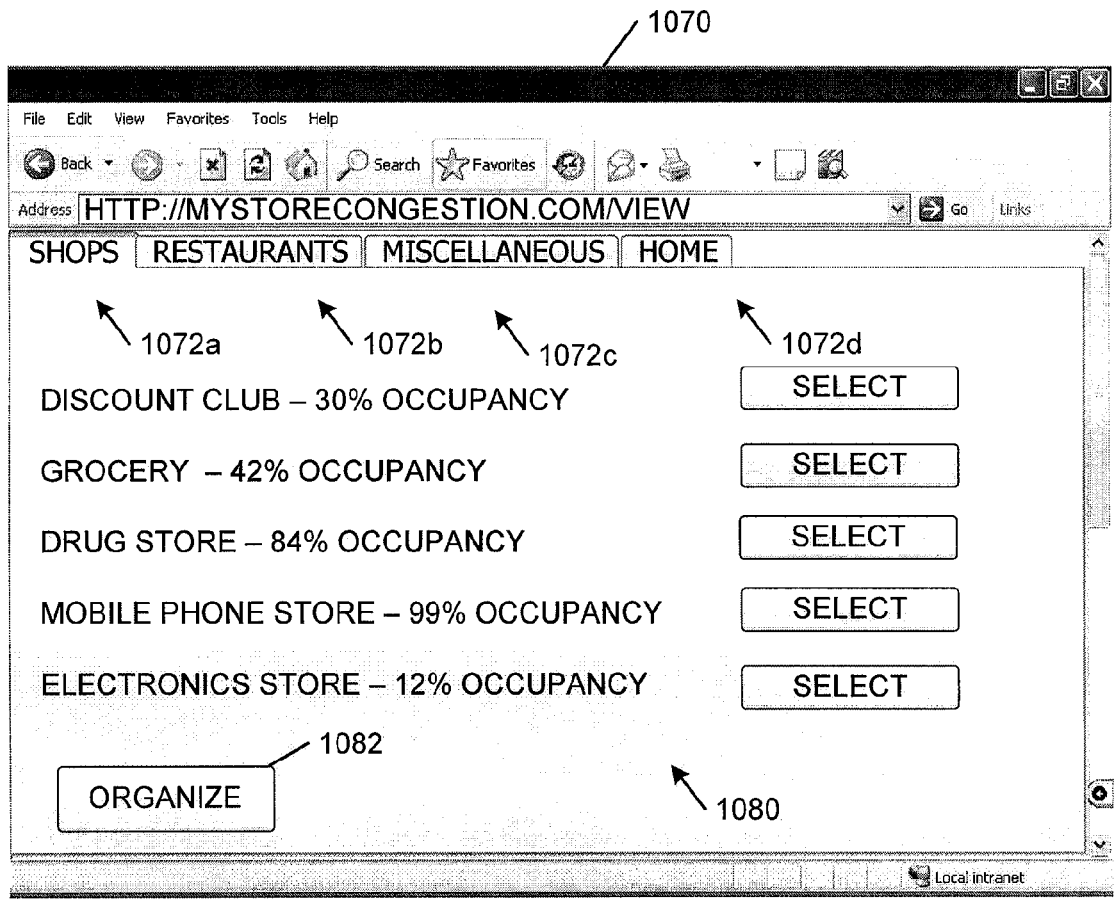
FIG. 10 is an exemplary user interface for providing users with the ability to view one or more environments, similar to the user interface from FIG. 9.

FIG. 10 is an exemplary user interface for providing users with the ability to view one or more environments, similar to the user interface from FIG. 9. More specifically, in at least one nonlimiting example, user interface 1070 may be presented to a user in response to selection of the "view my environments" option 972, (and/or authenticating via USERID and password or other authentication techniques) described above. User interface 1070 can be associated with a user account and can include a plurality of user configurable options, such as shops tab 1072a, restaurants tab 1072b, miscellaneous tab 1072c, and home tab 1072d. These tabs may be defined by a web designer and/or by the user. One or more of these tabs may include one or more environments associated with the tab label. The user can create new tabs, delete tabs, and otherwise organize environments via selection of "organize" option 1082. User interface 1070 also includes data 1080 related to one or more environment.

As illustrated in FIG. 10, shops tab 1072a is currently selected, and displays a plurality of shops 1080. Included in the displayed shops are discount club, grocery, drug store, mobile phone store, and electronics store. Next to each store is a current occupancy level of that store. As discussed above, occupancy (as well as other data) can be determined based on the number of subjects currently located in the environment and/or other data such as average number of subjects waiting for service, average wait time, etc. User interface 1070 may be configured to display occupancy level (in numerical form, graphical form, and/or other form) as a quick view for a user to determine whether to visit that environment. Additionally, if the user prefers a quick view for other information (such as average wait time, etc.), the user can select "organize" option 1082 and make such changes.

Figure 11:
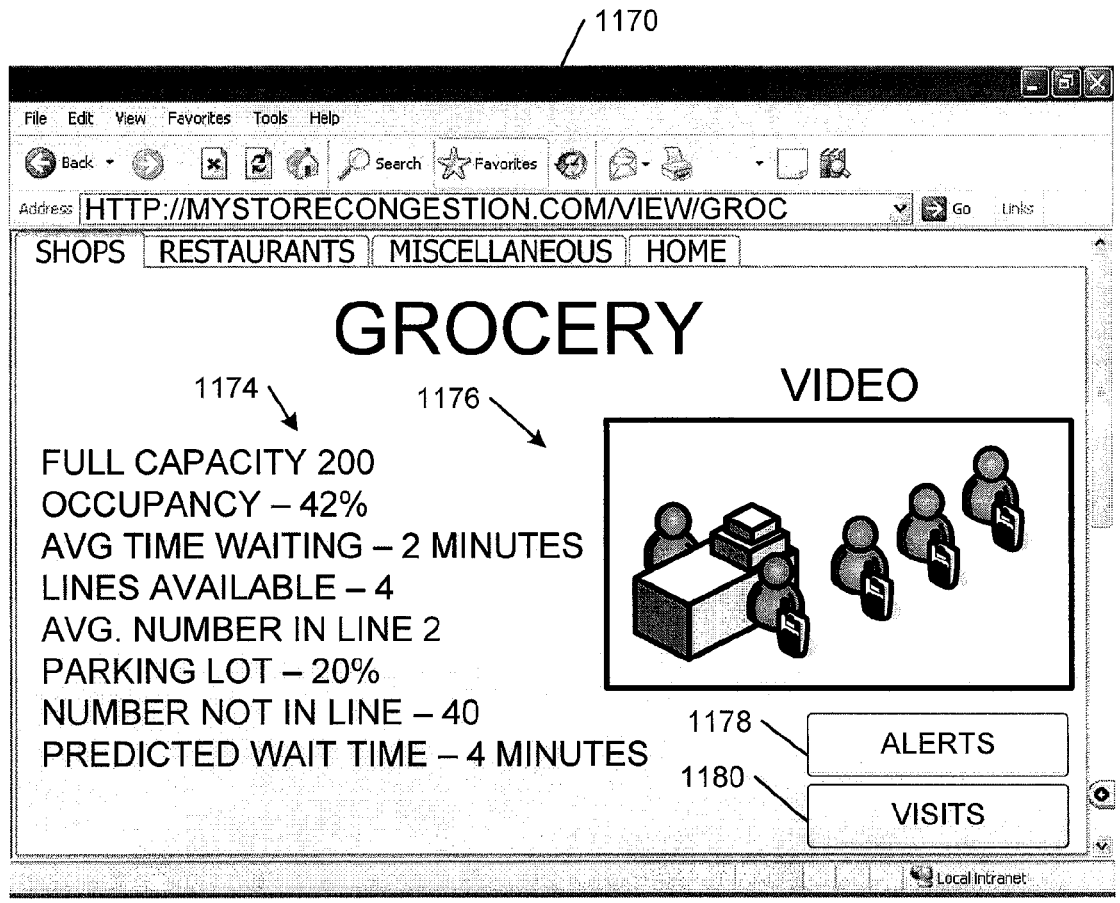
FIG. 11 is an exemplary user interface illustrating a display that may be provided in response to a user selecting an environment from FIG. 10.

FIG. 11 is an exemplary user interface illustrating a display that may be provided in response to a user selecting an environment from FIG. 10. More specifically, in response to selecting "select" option associated with the grocery environment, user interface 1170 may be displayed. User interface 1170 can include a plurality of data 1174 (which may be user configurable, depending on the particular embodiment) for determining the occupancy of the selected environment. Additionally included in the nonlimiting example of user interface 1170 is a video 1176 (live and/or recorded) of one or more sections of the selected environment. Other embodiments may include a pictorial representation of occupancy data related to at least a portion of the environment. Additionally included are "alerts" option 1178 and "visits" option 1180.

More specifically, "visits" option 1180 can allow the user to view previous visits to the selected environment. As a nonlimiting example, the user may see that the grocery currently has 42% occupancy, however, he or she may not know whether this is more or less occupied than his/her last visit to the grocery. Additionally, "visits" option 1180 can provide a documentation of normal visit times and/or provide recommendations for alternate times when the environment is less crowded. While the user can manually provide data related to when the user visits an environment, this is a nonlimiting example. In at least one embodiment, local network 110 can determine when a particular user enters an environment and correlate this data with that user's account.

Figure 12:
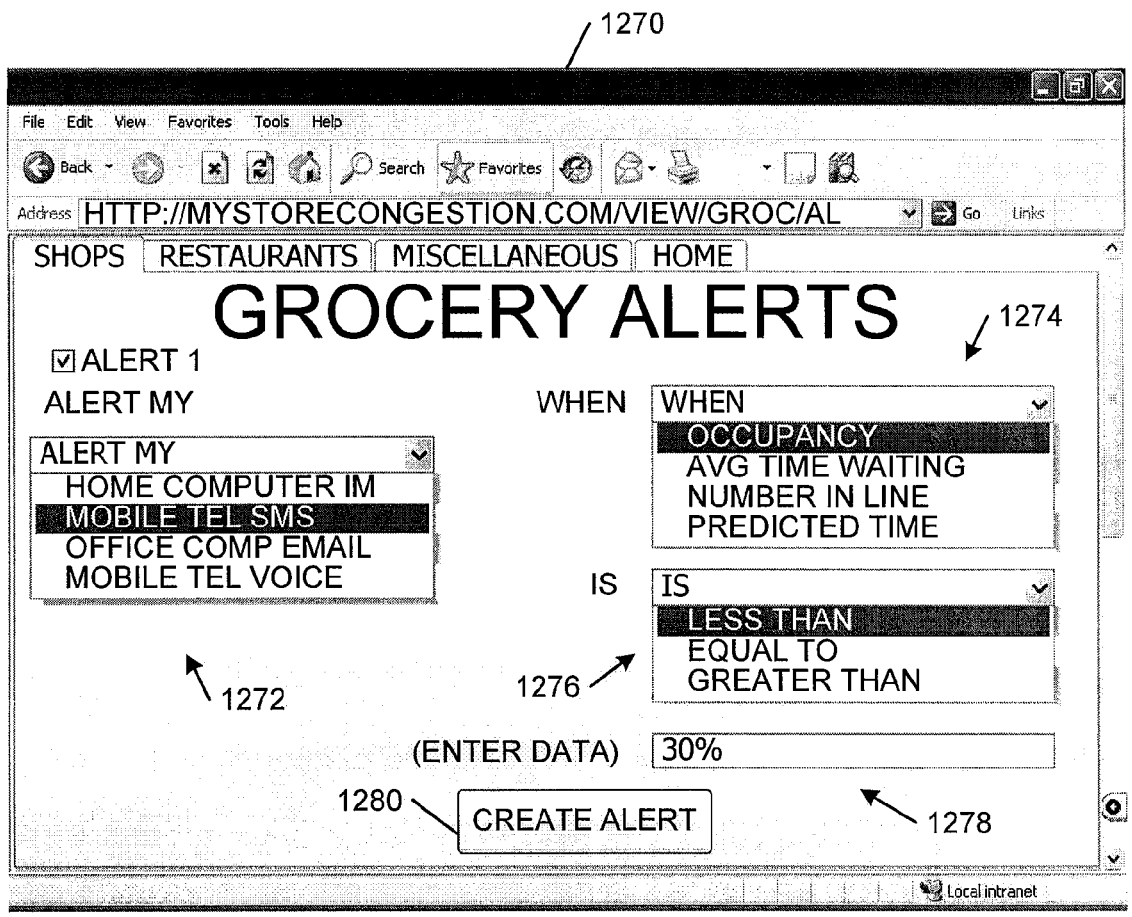
FIG. 12 is an exemplary user interface for providing alerts to a client device, similar to the user interface from FIG. 11.

FIG. 12 is an exemplary user interface for providing alerts to a client device, similar to the user interface from FIG. 11. More specifically, user interface 1270 can be configured to allow a user to set up one or more alert to a client device. As a nonlimiting example, referring back to FIG. 11, if a user sees that the current occupancy level of the grocery is 42% and feels that the grocery is currently too crowded, the user can select "alerts" option 1178. As illustrated, user interface 1270 can be provided for sending the user an alert when a certain event occurs with this environment. As illustrated in "alert my" menu 1272, the user can select one or more client devices for receiving the alert. The user can determine whether to receive a text, email, instant message, voice, video, and/or other message at one or more of the client devices. As one of ordinary skill in the art will understand, the client devices listed in menu 1272 may be associated with an address for receiving the alert. The address can include an Internet Protocol (IP) address, telephone number, email address, instant messaging address, and/or other address for receiving an alert.

The user can additionally select a condition for the alert, as illustrated in "when" menu 1274. The condition can include occupancy, average time waiting, number of subjects in line, predicted time waiting, and/or other conditions related to the environment. The user can then select an operator as illustrated in "is" menu 1276. The operator can include less than, equal to, greater than, and/or other operators. The user can then enter criteria for triggering the alarm, as illustrated in text box 1278. The user can then select "create alert" option 1280.

In the nonlimiting example of FIG. 12, upon selecting the "create alert" option 1280, an alert can be sent to the user's mobile telephone via a Short Messaging Service (SMS) format. The alert can be triggered when the occupancy of the grocery reaches a level of less than 30% capacity. Other and/or additional alerts can also be configured for this and/or other environments.

Figure 13:
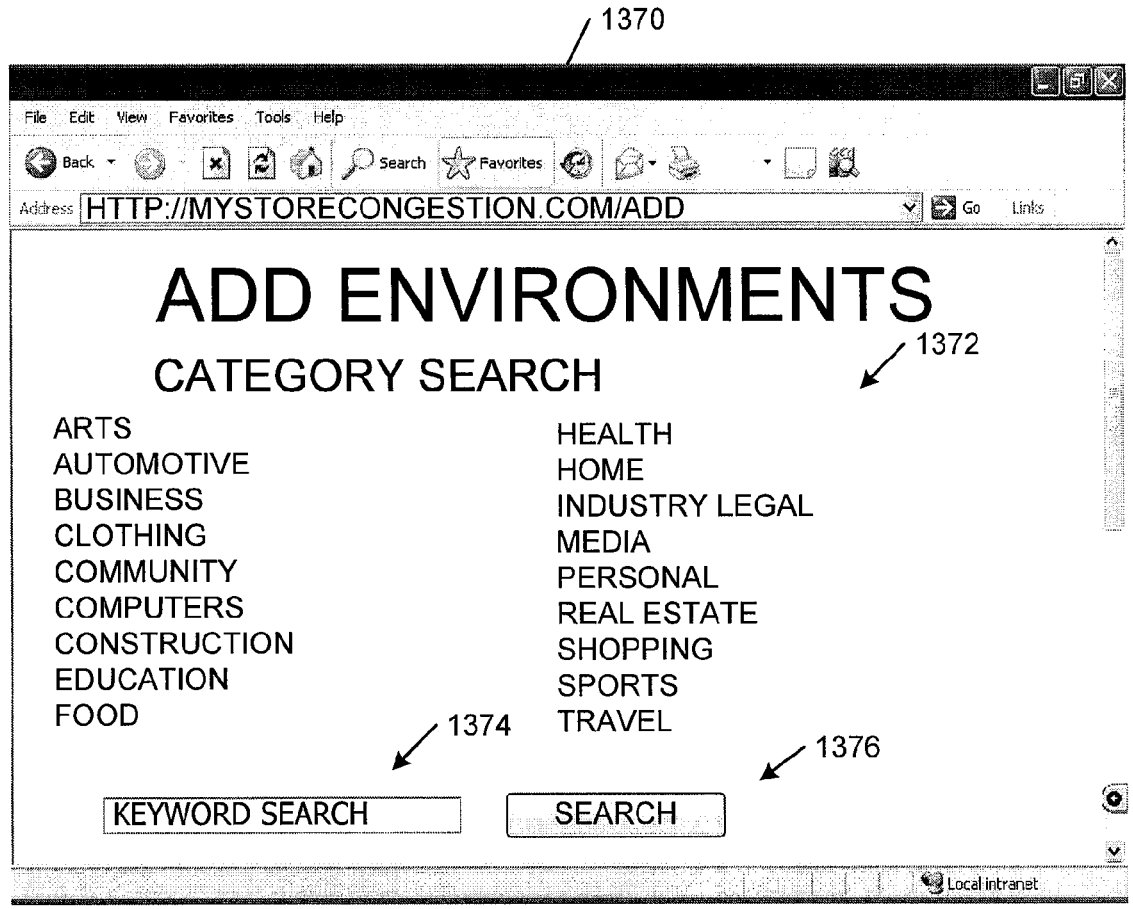
FIG. 13 is an exemplary user interface for providing user options to add an environment to a user account, similar to the user interface from FIG. 10.

FIG. 13 is an exemplary user interface for providing user options to add an environment to a user account, similar to the user interface from FIG. 10. More specifically, in at least one embodiment, user interface 1370 can include a plurality of categories 1372 for locating the desired environment. While certain categories are listed in user interface 1370, one of ordinary skill in the art will understand that these are nonlimiting examples, as more, fewer, and/or different categories may also be included. Additionally included in user interface 1370 is a keyword search text bar 1374 for locating a desired environment. More specifically, if the user knows the environment name that he or she desires to add to a personal account, the user can input a keyword related to this environment and select "search" option 1376.

Figure 14:
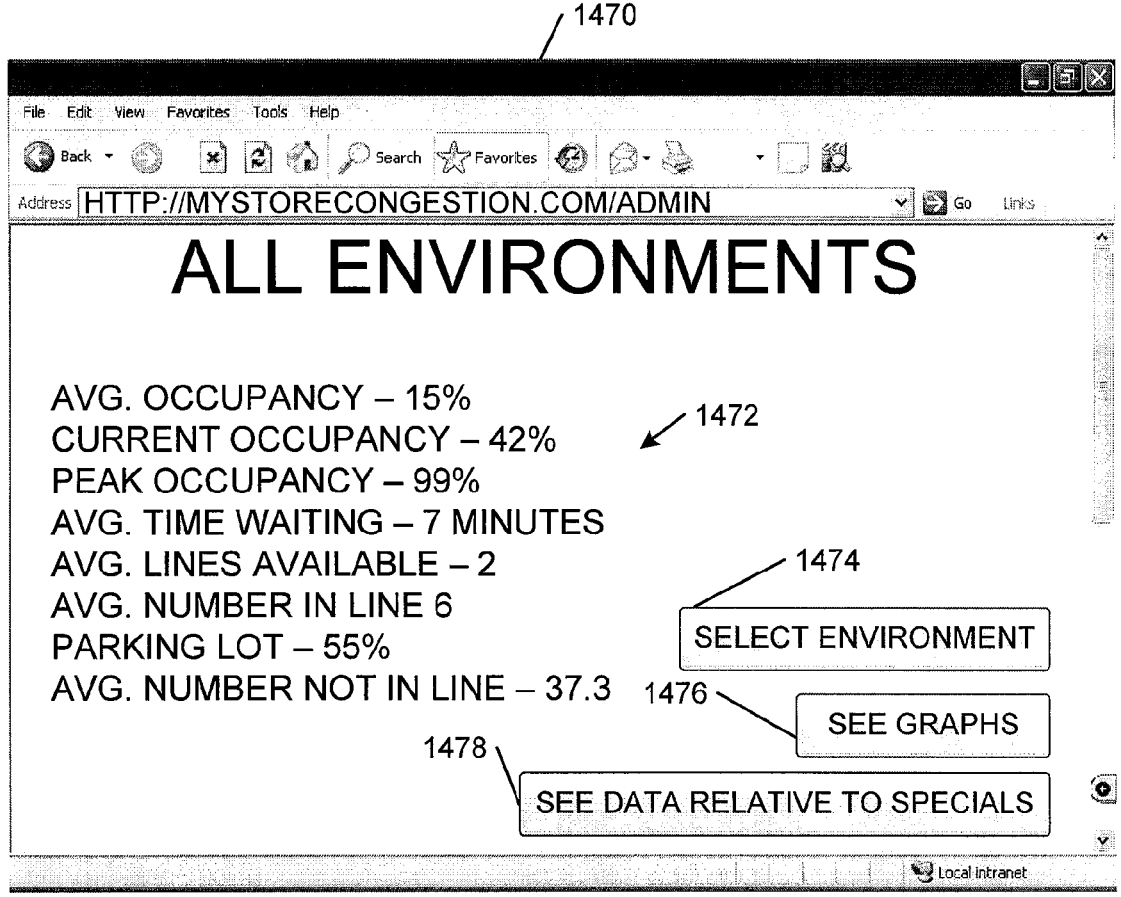
FIG. 14 is an exemplary user interface for providing environment data to an administrator, similar to the user interface from FIG. 9.

FIG. 14 is an exemplary user interface for providing environment data to an administrator, similar to the user interface from FIG. 9. More specifically, in at least one embodiment, by selecting "view my environments" option 976, (and/or authenticating via, for example, USERID and password) an administrator can access user interface 1470 option. Additionally, as illustrated in FIG. 14, user interface 1470 can include a plurality of data 1472 related to environments managed by this administrator. One should note that while various information is displayed in user interface 1470, this is a nonlimiting example, as more, fewer, and/or different information may also be displayed.

Also included in user interface 1470 is a "select environment" option 1474, a "see graphs" option 1476, and a "see data relative to specials" option 1478. The "select environment" option 1474 may provide the user with the ability to select a specific environment that the administrator wishes to view. Similarly, the "see graphs" option 1476 can provide the administrator with graphical representations of at least a portion of data available about one or more of the environments in this environment family. The "see data relative to specials" option 1478 can provide the administrator with various occupancy and efficiency data relative to specials that were being offered at that time. More specifically, if user interface 1470 is related to a plurality of "Chuck's Wagon" restaurants, by selecting the "see data relative to specials" option 1478 the administrator can determine how efficient and/or occupied one or more of the restaurants were during happy hours, "kids eat free" specials, etc. Additionally, while an administrator can view this data for all restaurants, an option can also be provided to allow the administrator to view a single restaurant, compare any two (or more) restaurants, compare the same restaurant versus "non-specials," etc.

Figure 15:
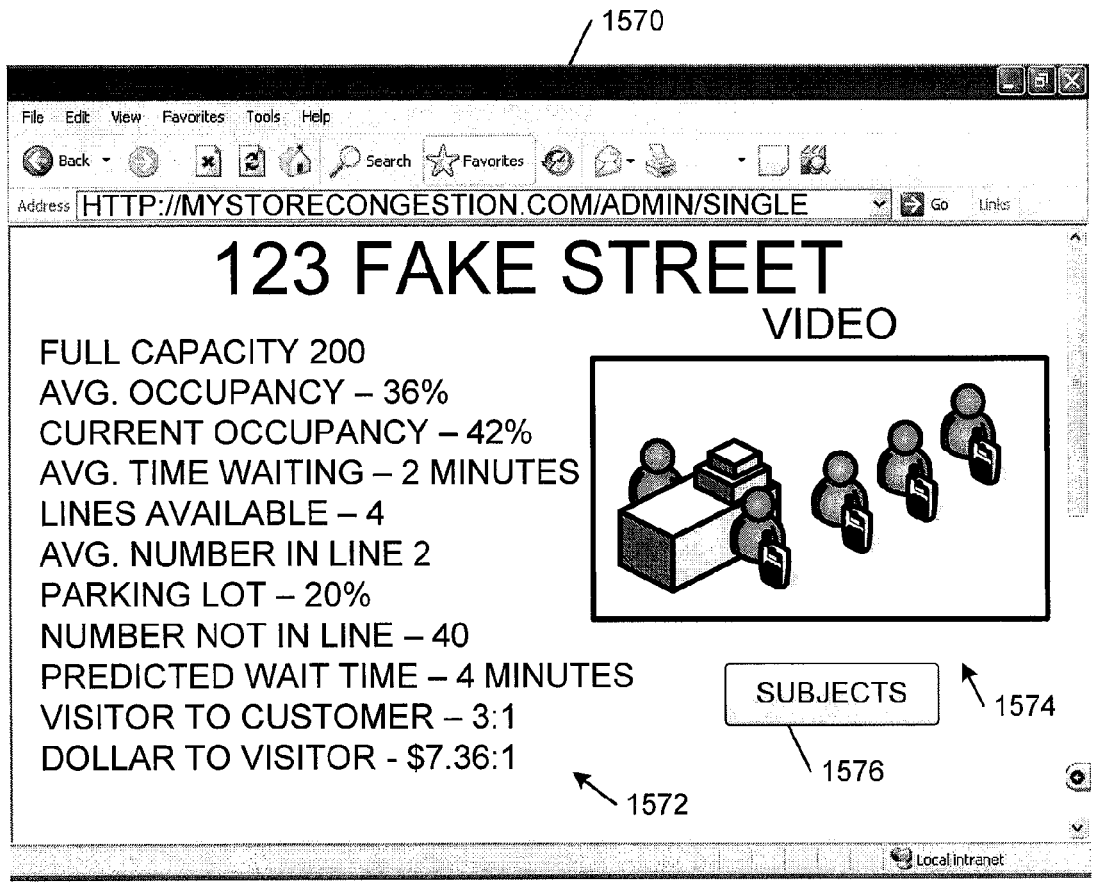
FIG. 15 is an exemplary user interface for providing data related to an environment, similar to the user interface from FIG. 14.

FIG. 15 is an exemplary user interface for providing data related to an environment, similar to the user interface from FIG. 14. As illustrated, at least one embodiment of user interface 1570 can include a plurality of data 1572 related to a particular environment. While at least a portion of the data 1572 displayed in user interface 1570 may correlate to data 1174 displayed in user interface 1170, this is not a requirement. In at least one embodiment data 1572 includes information, such as a correlation between total visitors to customers (e.g., a relationship between everyone who enters the environment versus those that purchase a good and/or service) may not be displayed in user interface 1170.

Also included in user interface 1570 is a video display 1574 related to the environment. While the video display 1574 may provide current and/or recorded video to an administrator, other embodiments may simply provide a pictorial representation of occupancy for at least a portion of the environment. Also included in user interface 1570 is a "customers" option 1576. "Customers" option 1576 can provide an administrator with data related to subjects who are currently seeking customer service.

Figure 16:
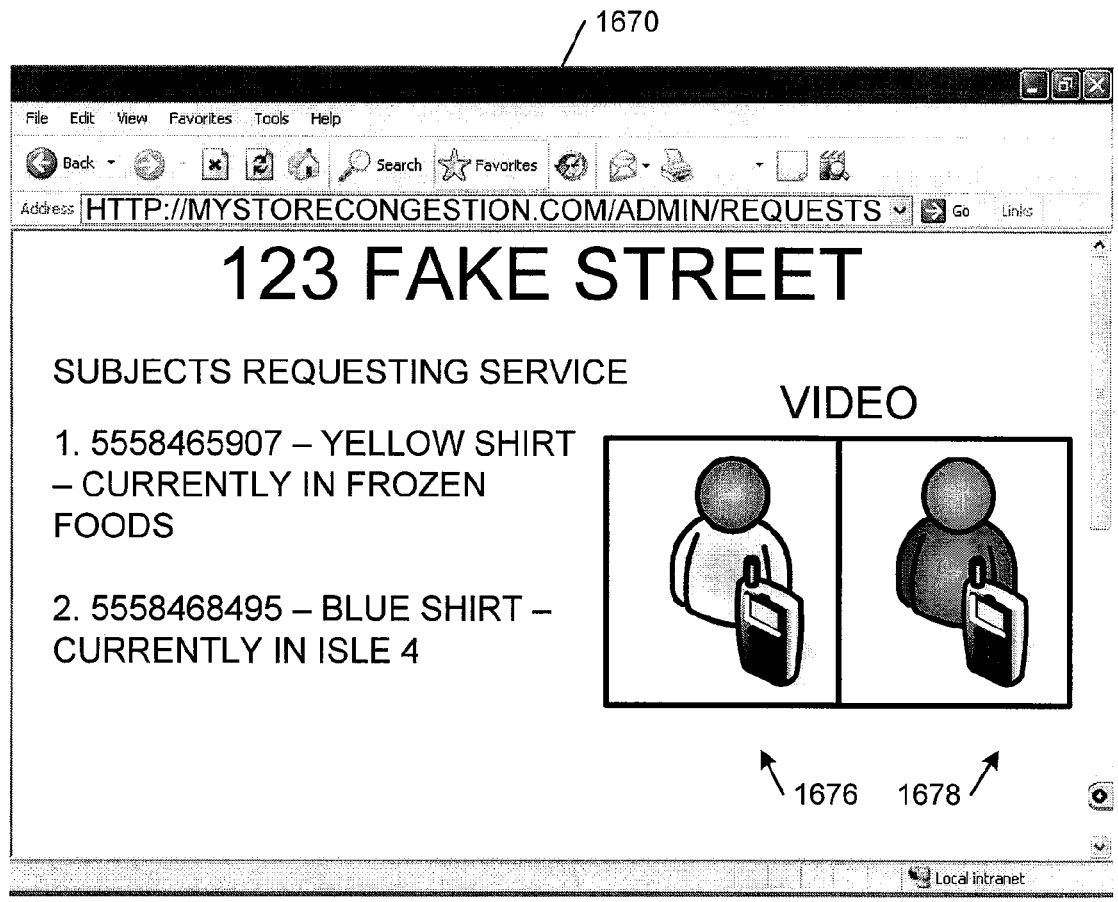
FIG. 16 is an exemplary user interface for providing customer service data to an administrator, similar to the user interface of FIG. 15.

FIG. 16 is an exemplary user interface for providing customer service data to an administrator, similar to the user interface of FIG. 15. More specifically, as illustrated in user interface 1670, data related to users requesting customer service may be provided. More specifically, a subject may desire to talk with a representative (e.g., a customer service representative) of the environment for any of a plurality of reasons. In this nonlimiting example, the subject can make a request for customer service. The local network 110 can receive the request and determine which subject made the request. This information can be stored such that the next available representative can contact the next subject. In addition, identifying information can also be gathered to assist the representative in locating the subject.

As illustrated in user interface 1670, a client device identifier can be provided by local network 110 for identifying the subject desiring assistance. Additionally, as local network 110 can be configured to determine location of the subject, his or her location may also be provided, as well as one or more identifying characteristic of the subject. More specifically, in the nonlimiting example of user interface 1670, the first subject desiring assistance has a client device with an identifier 5558465907. This subject is wearing a white shirt and is currently located in the frozen foods section. A picture and/or video of the subject is displayed in video display 1676. Similarly, the second subject desiring assistance has a client device with an identifier 5558468495. This subject is wearing a blue shirt and is currently located in isle 4. A picture and/or video of the subject is displayed in video display 1678.

One should note that while this information may be provided to an administrator of the environment, this is a nonlimiting example. More specifically, in at least one embodiment, at least a portion of this information can be provided to a user desiring information on the wait time for receiving assistance. Additionally, depending on the particular configuration, the user can request assistance remotely, such that when he or she enters the store, the wait time for assistance will be reduced.

Figure 17:
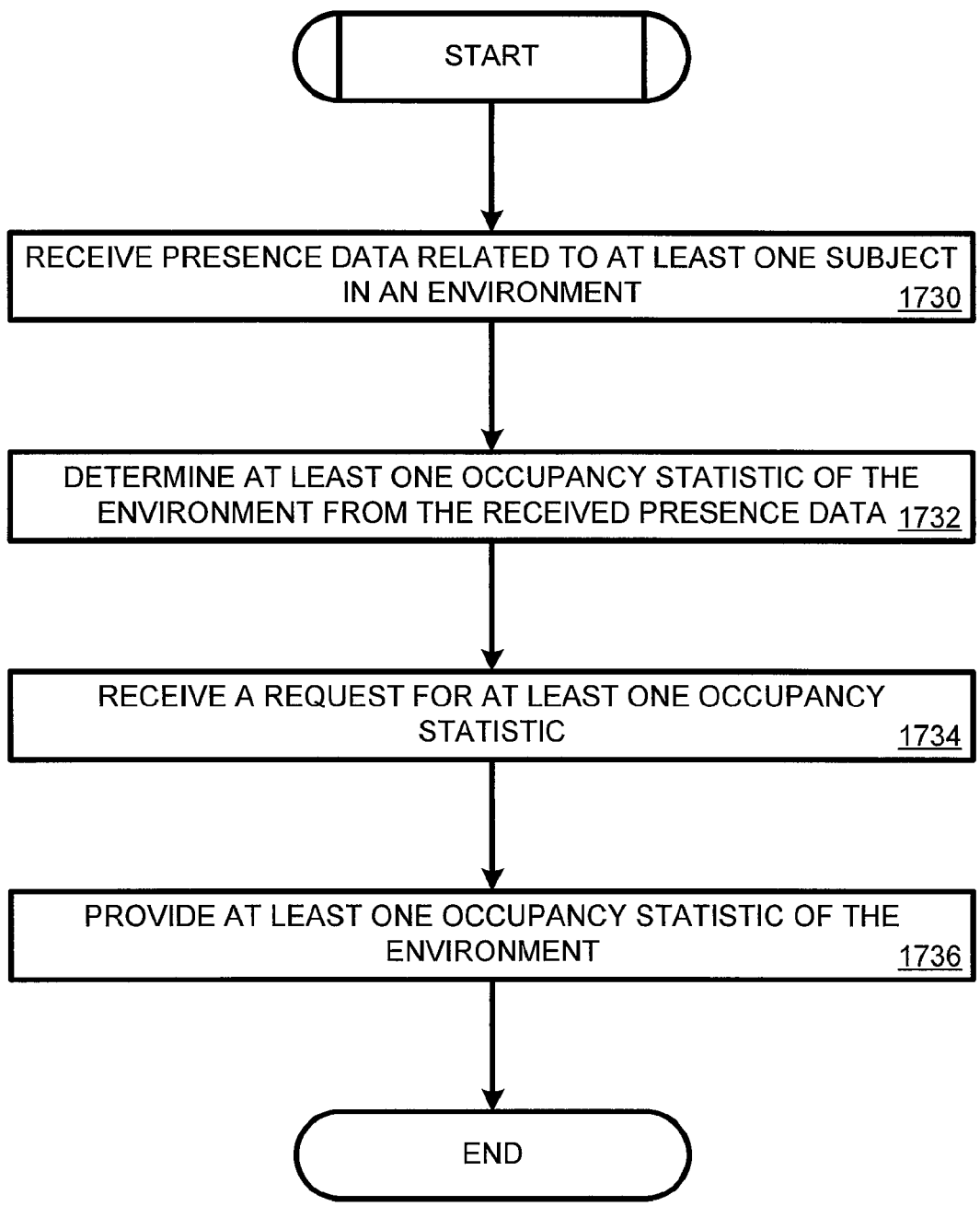
FIG. 17 is a flowchart illustrating exemplary steps that may be performed for providing at least one occupancy statistic related to an environment, such as the environment from FIG. 4.

FIG. 17 is a flowchart illustrating exemplary steps that may be performed for providing at least one occupancy statistic related to an environment, such as the environment from FIG. 4. As illustrated in the nonlimiting example of FIG. 17, local network 110 can receive presence data (and/or location data) related to at least one subject in an environment (block 1730). The local network 110 can then determine at least one occupancy statistic of the environment from the received presence data (block 1732). The local network 110 can then receive a request for at least one occupancy statistic (block 1734). The request can come from a user, administrator, and/or other party. The local network 110 can then provide at least one occupancy statistic of the environment to the requesting party (block 1736).

Figure 18:
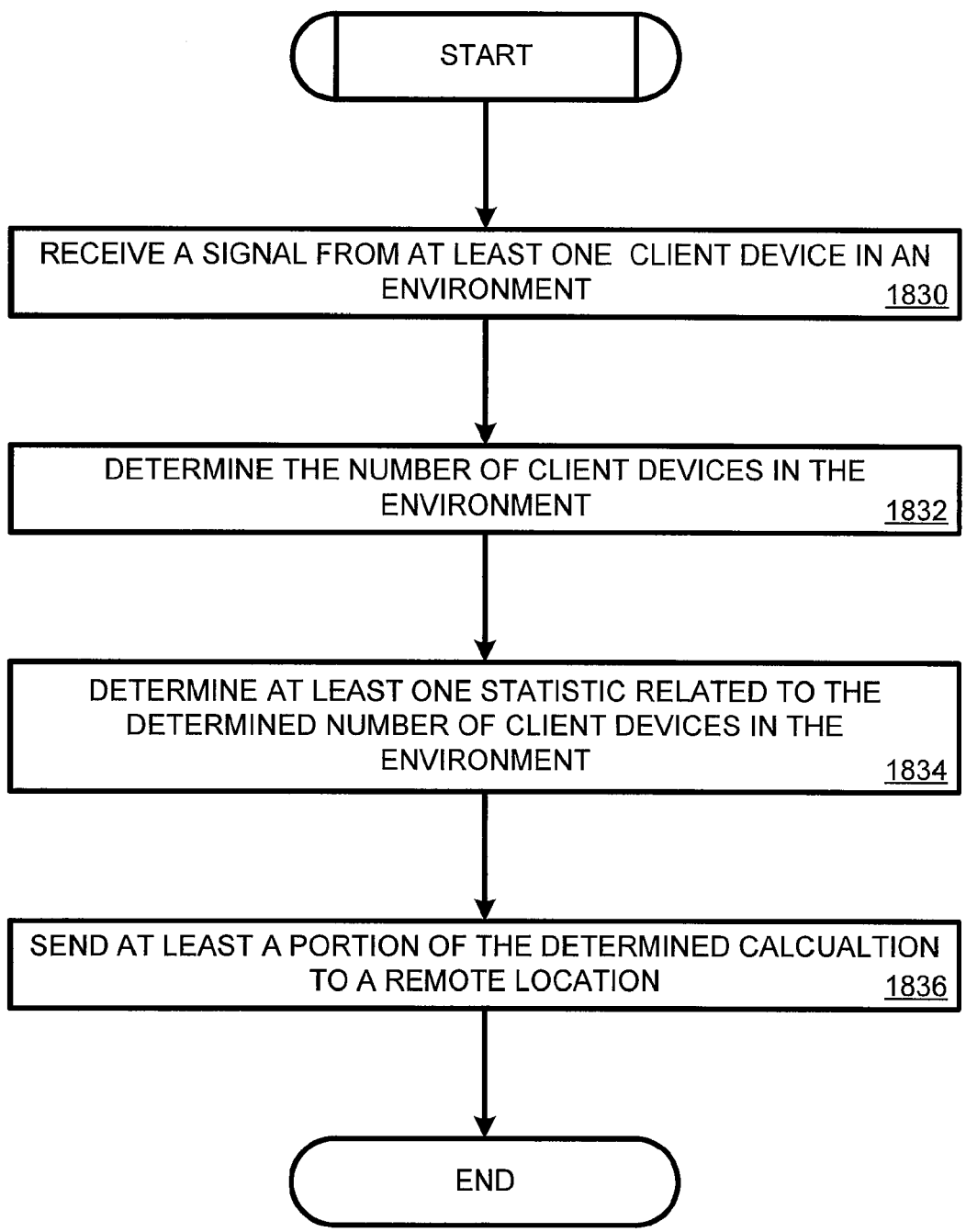
FIG. 18 is a flowchart illustrating exemplary steps that can be taken for monitoring an environment, similar to the flowchart from FIG. 17.

FIG. 18 is a flowchart illustrating exemplary steps that can be taken for monitoring an environment, similar to the flowchart from FIG. 17. More specifically, in the nonlimiting example of FIG. 18, the local network 110 can receive a signal from at least one client device 106 in an environment (block 1830). The local network can then determine the number and/or location the client devices 106 in the environment (block 1832). The local network 110 can then determine at least one statistic related to the determined portable devices in the environment (block 1834). The local network 110 can then send at least a portion of the determined statistic to a remote location (block 1836).

Figure 19:
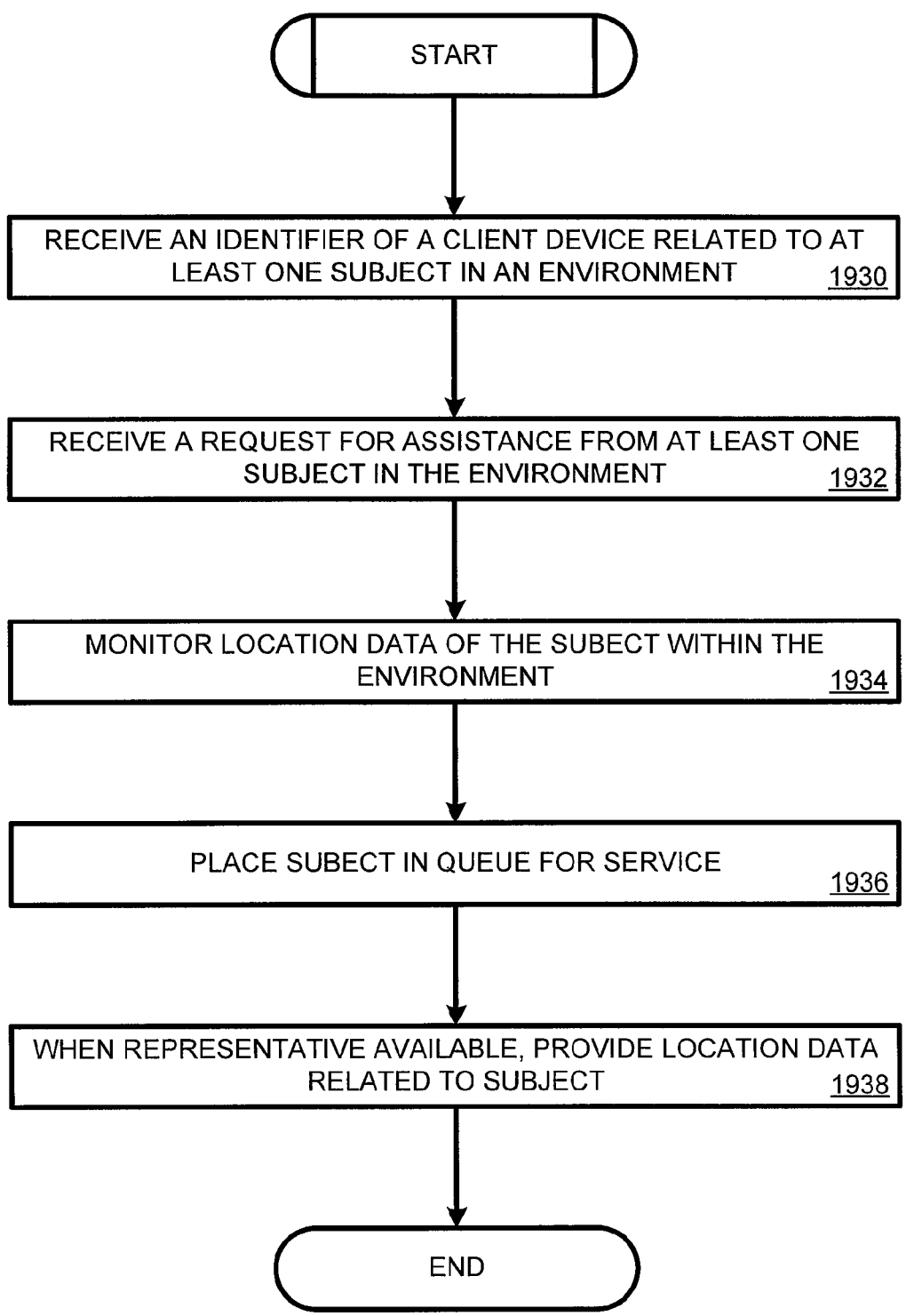
FIG. 19 is a flowchart illustrating exemplary steps that can be taken in providing assistance to a subject in an environment, similar to the flowchart from FIG. 18.

FIG. 19 is a flowchart illustrating exemplary steps that can be taken in providing assistance to a subject in an environment, similar to the flowchart from FIG. 18. As illustrated in the nonlimiting example of FIG. 19, local network 110 can be configured to receive an identifier from a client device of a subject in an environment (block 1930). Local network 110 can receive a request for assistance from at least one subject in the environment (block 1932). The request can be received via the client device 106, however, this is not a requirement. Local network 110 can then monitor the location of the subject within the environment (block 1934). Local network 110 can place the subject who requested assistance in queue for the next available representative (block 1936). When a representative is available to assist the subject, local network 110 can provide location data related to subject (block 1938).

Figure 20:
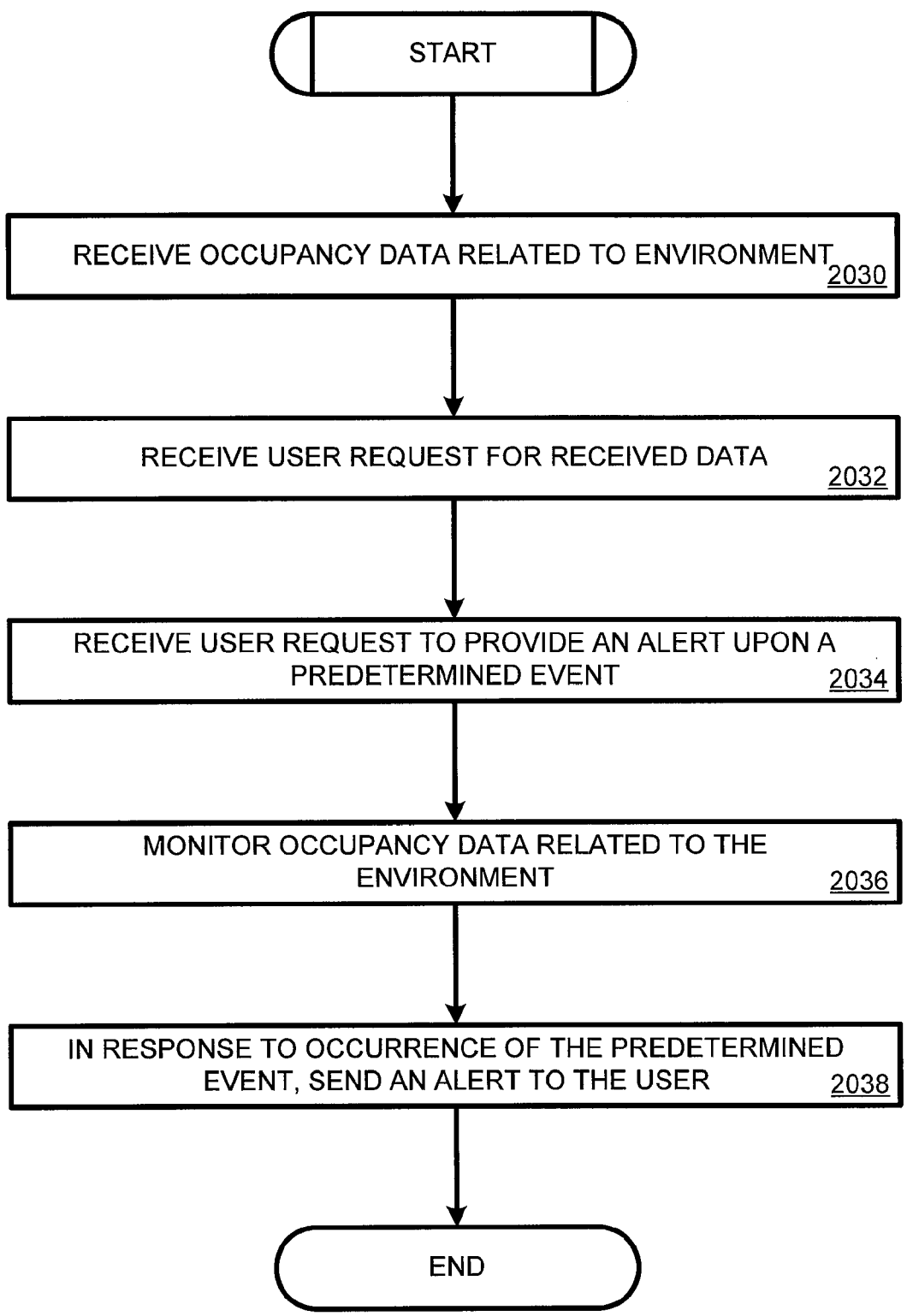
FIG. 20 is a flowchart illustrating exemplary steps that can be taken in sending an alert related to an environment, similar to the flowchart from FIG. 19.

FIG. 20 is a flowchart illustrating exemplary steps that can be taken in sending an alert related to an environment, similar to the flowchart from FIG. 19. More specifically, as illustrated in the nonlimiting example of FIG. 20, local network 110 can receive occupancy data related to an environment (block 2030). Local network 110 can then receive a user request for occupancy data (block 2032). This can come in the form of a user accessing a user interface, as illustrated in FIGS. 9-16. The local network 110 can then receive a user request to provide an alert upon the occurrence of a predetermined event (block 2034). Local network 110 can then monitor occupancy data related to the environment (block 2036). Local network 110 can then, in response to occurrence of the predetermined event, send an alert to the user (block 2038).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the flowcharts described herein refer to steps that can be completed by local network 110, this is a nonlimiting example. More specifically, in at least one embodiment, server 102 can perform one or more of these steps. Similarly, other embodiments can provide that while local network 110 performs one or more of these steps, the steps may, more specifically, be performed by one or more local servers 202.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, and/or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for providing crowd determination, comprising:
   receiving presence data related to a subject in an environment, the presence data being received from a client device associated with a subject;
   calculating a number of people in the environment from the presence data;
   providing an occupancy statistic of the environment; and
   sending an alert to a user when the occupancy statistic reaches a predetermined occupancy level, the predetermined occupancy level being determined by the user, wherein the predetermined occupancy level is determined by:
   receiving a crowd determination parameter from the subject indicating a preference of the subject towards a current level of congestion of the environment; and
   saving the current level of congestion as the predetermined occupancy level for determination of whether the subject will desire to visit the environment at a subsequent time.

2. The method of claim 1, wherein the presence data includes an identifier of a client device.

3. The method of claim 1, further comprising receiving location data of the subject in the environment.

4. The method of claim 1, wherein providing the occupancy statistic includes providing data related to a current wait time for the subject in the environment.

5. The method of claim 1, further comprising receiving a request for the occupancy statistic.

6. The method of claim 1, wherein the presence data is received from the client device at a server device, and wherein the presence data indicates to the server device that the subject is currently located within the environment.

7. The method of claim 1, wherein the occupancy statistic is calculated from the number of people in the environment and a maximum occupancy of the environment.

8. A computer readable medium that stores a computer program for providing crowd determination, that when executed by a computer, causes the computer to perform at least the following:
   receiving presence data related to a subject in an environment, the presence data being received from a client device associated with the subject;
   calculating a number of people in the environment from the presence data;
   determining a location within the environment of each of the number of people in the environment;
   determining an occupancy statistic of the environment from the number of people in the environment and the location of each of the number of people within the environment, where at least a portion of the number of people are excluded from the occupancy statistic, based on their location within the environment; and
   sending an alert to a user when the occupancy statistic reaches a predetermined occupancy level, the predetermined occupancy level being determined by the user, wherein the predetermined occupancy level is determined by:
   receiving a crowd determination parameter from the subject indicating a preference of the subject towards a current level of congestion of the environment; and
   saving the current level of congestion as the predetermined occupancy level for determination of whether the subject will desire to visit the environment at a subsequent time.

9. The computer readable medium of claim 8, wherein the presence data includes an identifier of a client device.

10. The computer readable medium of claim 8, wherein the program is further configured to cause the computer to perform at least the following: receiving location data of the subject in the environment.

11. The computer readable medium of claim 8, wherein providing the occupancy statistic includes providing data related to a current wait time for a subject in the environment.

12. The computer readable medium of claim 8, wherein the program is further configured to cause the computer to perform at least the following: receiving a request for the occupancy statistic related to the environment.

13. The computer readable medium of claim 8, wherein the presence data is received from the client device at a server device, and wherein the presence data indicates to the server device that the subject is currently located within the environment.

14. The computer readable medium of claim 8, wherein the occupancy statistic is calculated from the number of people in the environment and a maximum occupancy of the environment.

15. A system for providing crowd determination, comprising:
   a receiving module configured to receive presence data related to a subject in an environment, the presence data being received from a client device associated with the subject;
   a calculating module configured to calculate a number of people in the environment from the received presence data; and
   a providing module configured to provide an occupancy statistic of the environment; and
   a sending component configured to send an alert to a user when the occupancy statistic reaches a predetermined occupancy level, the predetermined occupancy level being determined by the user, wherein the predetermined occupancy level is determined by:
   receiving a crowd determination parameter from the subject indicating a preference of the subject towards a current level of congestion of the environment; and
   saving the current level of congestion as the predetermined occupancy level for determination of whether the subject will desire to visit the environment at a subsequent time.

16. The system of claim 15, wherein the presence data includes an identifier of a client device.

17. The system of claim 15, further comprising a location module configured to receive location data of the subject in the environment.

18. The system of claim 15, wherein the providing module is further configured to provide data related to a current wait time for the subject in the environment.

19. The system of claim 15, wherein the presence data is received from the client device at a server device, and wherein the presence data indicates to the server device that the subject is currently located within the environment.

20. The system of claim 15, wherein the occupancy statistic is calculated from the number of people in the environment and a maximum occupancy of the environment.

* * * * *